(12) United States Patent
Fatemi et al.

(10) Patent No.: US 11,569,912 B2
(45) Date of Patent: *Jan. 31, 2023

(54) MULTI-BEAM OPTICAL PHASED ARRAY

(71) Applicant: California Institute of Technology, Pasadena, CA (US)

(72) Inventors: Seyed Mohammadreza Fatemi, Pasadena, CA (US); Aroutin Khachaturian, Glendale, CA (US); Seyed Ali Hajimiri, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/195,471

(22) Filed: Mar. 8, 2021

(65) Prior Publication Data

US 2021/0409120 A1 Dec. 30, 2021

Related U.S. Application Data

(63) Continuation of application No. 16/458,911, filed on Jul. 1, 2019, now Pat. No. 10,944,477.
(Continued)

(51) Int. Cl.
*H04B 10/04* (2006.01)
*H04B 10/40* (2013.01)
(Continued)

(52) U.S. Cl.
CPC ............. *H04B 10/40* (2013.01); *G02F 1/292* (2013.01); *H04B 10/572* (2013.01); *H04B 10/61* (2013.01)

(58) Field of Classification Search
CPC ... H04B 10/11; H04B 10/112; H04B 10/1123; H04B 10/114; H04B 10/1143;
(Continued)

(56) References Cited

U.S. PATENT DOCUMENTS 5,157,257 A 10/1992 Geiger
5,977,910 A 11/1999 Matthews
(Continued)

OTHER PUBLICATIONS

U.S. Appl. No. 16/458,911, Non-Final Office Action dated Apr. 1, 2020.
(Continued)

*Primary Examiner* — Hanh Phan
(74) *Attorney, Agent, or Firm* — Weaver Austin Villeneuve & Sampson LLP

(57) ABSTRACT

An optical phased array, includes, in part, K beam processors each adapted to receive a different one of K optical signals and generate N optical signals in response. The difference between the phases of optical signals $a_{LM}$ and $a_{L(M+1)}$ is the same for all Ms, where M is an integer ranging from 1 to N−1 defining the signals generated by a beam processor, and L is an integer ranging from 1 to K defining the beam processor generating the K optical signals. The transmitter further includes, in part, a combiner adapted to receive the N×K optical signals from the K beam processors and combine the K optical signals from different ones of the
(Continued)

K beam processors to generate N optical signals. The transmitter further includes, in part, N radiating elements each adapted to transmit one of the N optical signals.

11 Claims, 14 Drawing Sheets

Related U.S. Application Data

(60) Provisional application No. 62/692,469, filed on Jun. 29, 2018.

(51) Int. Cl.
  *G02F 1/29* (2006.01)
  *H04B 10/572* (2013.01)
  *H04B 10/61* (2013.01)

(58) Field of Classification Search
  CPC .... H04B 10/1149; H04B 10/40; H04B 10/61; H04B 10/572; H04B 10/613; H04B 10/616; H04B 10/548; G01S 7/484; G01S 7/4817; G01S 7/486; G01S 17/10; G01S 17/42; G02F 1/292
  USPC ....... 398/118, 119, 120, 123, 127, 128, 130, 398/183, 188, 159, 192, 193, 194, 195, 398/135, 136, 124, 202, 208, 209; 342/368, 372, 371, 373, 367
  See application file for complete search history.

(56) References Cited

U.S. PATENT DOCUMENTS

| | | | |
|---|---|---|---|
| 6,127,972 A * | 10/2000 | Avidor | H01Q 1/246 |
| | | | 342/367 |
| 7,283,751 B2 * | 10/2007 | Bruesselbach | H04B 10/112 |
| | | | 398/119 |
| 9,541,426 B2 | 1/2017 | Farhadiroushan et al. | |
| 10,944,477 B2 * | 3/2021 | Fatemi | H04B 10/40 |
| 2013/0163705 A1 | 6/2013 | Stirland et al. | |
| 2015/0043009 A1 | 2/2015 | Bridges et al. | |
| 2016/0139266 A1 | 5/2016 | Montoya et al. | |
| 2016/0345940 A1 | 12/2016 | Wegner et al. | |
| 2016/0380711 A1 | 12/2016 | Feigin et al. | |
| 2017/0310006 A1 | 10/2017 | Vidal Drummond et al. | |
| 2018/0052378 A1 | 2/2018 | Shin et al. | |
| 2018/0167102 A1 | 6/2018 | Ray et al. | |

OTHER PUBLICATIONS

WIPO Application No. PCT/US2019/040150, PCT International Search Report and Written Opinion of the International Searching Authority dated Nov. 20, 2019.

U.S. Appl. No. 16/458,911, filed Jul. 1, 2019, now U.S. Pat. No. 10,944,477.

U.S. Notice of Allowance dated Nov. 2, 2020 in U.S. Appl. No. 16/458,911.

WO International Preliminary Report on Patentability dated Jan. 7, 2021 in PCT Application No. PCT/US2019/040150.

* cited by examiner

MULTI-BEAM OPTICAL PHASED ARRAY

CROSS REFERENCE TO RELATED APPLICATIONS

The present application is a continuation application of application Ser. No. 16/458,911, filed Jul. 1, 2019 which claims benefit under 35 USC 119(e) of U.S. Application Ser. No. 62/692,469 filed Jun. 29, 2018, the content of which is incorporated herein by reference in its entirety.

FIELD OF THE INVENTION

The present invention is related to optical phased arrays.

BACKGROUND OF THE INVENTION

Optical phased arrays have a wide range of applications such as free-space data communications, LIDAR ranging and velocimetry, coherent imaging, integrated adaptive optics, holographic projection and recording, lens-less projection, and lens-less displays. Integrated phased arrays allow the manipulation of optical wave fronts using integrated phase and amplitude modulators in a compact form factor. A need continues to exist for an improved optical phased array.

BRIEF SUMMARY OF THE INVENTION

An optical phased array transmitter, in accordance with one embodiment of the present invention, includes, in part, K beam processors each adapted to receive a different one of K optical signals and generate N optical signals in response wherein a difference between phases of optical signals $a_{LM}$ and $a_{L(M+1)}$ is the same for all Ms, where M is an integer ranging from 1 to N−1 defining the signals generated by a beam processor, and L is an integer ranging from 1 to K defining the beam processor generating the K optical signals.

The optical phased array transmitter further includes, in part, a combiner adapted to receive the N×K optical signals from the K beam processors and combine the K optical signals from different ones of the K beam processors to generate N optical signals. The optical phased array transmitter further includes, in part, N radiating elements each adapted to transmit one of the N optical signals.

In one embodiment, the difference between phases of each pair of associated optical signals generated by the same beam processor is the same. In one embodiment, the optical phased array transmitter further includes, in part, a splitter adapted to generate the K optical signals from a received optical signal. In one embodiment, each of the K optical signals has a different wavelength.

In one embodiment, each beam processor further includes, in part, a modulator adapted to modulate an amplitude and/or phase of the optical signal the beam processor receives. In one embodiment, each beam processor further includes, in part, a multitude of splitters adapted to split the modulated optical into N optical signals. In one embodiment, each beam processor further includes, in part, a multitude of phase shifters each adapted to shift a phases of one of the N optical signals. In one embodiment, each beam processor further includes, in part, a multitude of optical signal measurement units each adapted to receive and convert a portion of one of the N optical signals to an electrical signal.

In one embodiment, each optical signal measurement unit includes, in part, a photo-detector adapted to generate an electrical signal in response to a voltage that is turned on and off during different time periods. In one embodiment, each beam processor further includes, in part, a multitude of optical signal measurement units each adapted to receive and combine a portion of a different pair of N optical signals and convert the combined signal to an electrical signal.

In one embodiment, each beam processor further includes, in part, a multitude of optical signal measurement units. Each measurement unit includes, in part, a first optical signal coupler adapted to receive a portion of a first one of the N optical signals, a first splitter adapted to split the portion of the first optical signal into third and fourth optical signals, a second optical signal coupler adapted to receive a portion of a second one of the N optical signals, a second optical splitter adapted to split the portion of the second optical signal into fifth and sixth optical signals, a phase shifter adapted to shift the phase of the fifth optical signal by a first value to generate a seventh optical signal, a first optical signal combiner adapted to combine the third and sixth optical signals to generate an eight optical signal, a second optical signal combiner adapted to combine the fourth and seventh optical signals to generate a ninth optical signal, a first photo-detector adapted to convert the eight optical signal into a first electrical signal, and a second photo-detector adapted to convert the night optical signal into a second electrical signal. In one embodiment, the first value is defined by 90°.

In one embodiment, the optical phased array transmitter further includes, in part, a processing unit configured to determine a phase of the first optical signal relative to the phase of the second optical signal from the first and second electrical signals. In one embodiment, the processing unit is further configured to determine an amplitude of the first optical signal relative to an amplitude of the second optical signal from the first and second electrical signals.

In one embodiment, the beam processor includes, in part, N optical signal measurement units each adapted to receive and convert a portion of one N optical signals to an electrical signal. In one embodiment, N/2 optical signal measurement units are disposed along either lower or upper branches of the multitude of splitters. In one embodiment, the output signals of the measurement units at each split level of the multitude of splitters are coupled to one another. In one embodiment, each beam processor further includes, in part, a multitude of amplitude controllers each adapted to adjust an amplitude of one of the N optical signals An optical phased array receiver, in accordance with one embodiment of the present invention, includes, in part, K optical receive elements, K optical signal splitters each associated with one of the K optical receive elements and adapted to split an optical signal received by the associated receive elements into N optical signals, a phase shifter network responsive to the N×K optical signals supplied by the optical signal splitters and adapted to shift phases of at least a subset of the N×K optical signals. The phase shifter network supplies, in response, N groups of associated output optical signals each comprising K optical signals selected from a different one of the K optical signal splitters. The optical phased array receiver further includes, in part, N optical signal combiners each adapted to combine the K optical signals of a different one of the N groups to generate a combined signal.

In one embodiment, the difference between phases of each pair of associated optical signals supplied by the phase shifter network is the same. In one embodiment, the optical phased array receiver further includes, in part, N photodetectors each adapted to convert a different one of the N combined signals into a current signal.

In one embodiment, the optical phased array receiver further includes, in part, a processor adapted to form an image of an object using the N current signals. In one embodiment, the optical phased array receiver further includes, in part, K optical gain stages each adapted to amplify a different one of the K optical signals received by the K optical receive elements.

An optical phased array receiver, in accordance with one embodiment of the present invention, includes, in part, K optical receive elements, K optical signal splitters each associated with one of the K optical receive elements and adapted to split an optical signal received by the associated receive element into N optical signals, a first signal splitter adapted to split a reference signal into K×N reference optical signals, a phase shifter network adapted to shift phases of at least a subset of the N×K reference optical signals, and N×K mixers each adapted to mix a different one of the N×K reference optical signals with a different one of the N×K optical signals supplied by the K splitters. The N×K mixers supply, in response, N groups of associated current signals each including K current signals.

In one embodiment, the optical phased array receiver further includes, in part, N current summing nodes each adapted to sum the K associated current signals thereby to from N current signals. In one embodiment, the optical phased array receiver further includes, in part, a processor adapted to form an image of an object using the N current signals. In one embodiment, the optical phased array receiver further includes, in part, K optical gain stages each adapted to amplify a different one of the K optical signals received by the K optical receive elements.

An optical phased array receiver, in accordance with one embodiment of the present invention, includes, in part, K optical receive elements, a signal splitter adapted to split a reference signal into K reference optical signals, K mixers each adapted to mix a different one of the K reference optical signals with a different one of the K optical signals received by the K optical receive elements. The K mixers supply, in response, K current signals. The optical phased array receiver further, includes, in part, K phase shifter each receiving a different one of the current signals and generating N phase shifted current signals in response, and N current summing nodes each receiving N current signals each supplied by a different one of the K phase shifters. Each current summing nodes generates a combined current signal in response. In one embodiment, the optical phased array receiver further includes, in part, K gain stages each associated with a different one of the K phase shifters and adapted to increase an amplitude of a different one of the N phase shifted current signals.

An optical phased array receiver, in accordance with one embodiment of the present invention, includes, in part, K optical receive elements, a signal splitter adapted to split a reference signal into K reference optical signals, K mixers each adapted to mix a different one of the K reference optical signals with a different one of the K optical signals received by the K optical receive elements. The K mixers supply, in response, K current signals. The optical phased array receiver further includes, in part, K analog-to-digital converters each receiving a different one of the K current signals and generating a digital signal in response, and a signal processor adapted to form an image of an object using the K digital signals.

In one embodiment, the optical phased array receiver, further includes, in part, K gain stages each adapted to increase an amplitude of a different one of the K optical signals.

In one embodiment, the optical phased array further includes, in part, an amplitude control network responsive to the N×K optical signals supplied by the optical signal splitters and adapted to adjust amplitudes of at least a subset of the N×K optical signals. The amplitude control network supplies, in response, the N groups of associated output optical signals each including the K optical signals selected from a different one of the K optical signal splitters.

In one embodiment, the optical phased array further includes, in part, an amplitude control network adapted to adjust amplitudes of at least a subset of the N×K reference optical signals.

A co-prime optical transceiver includes, in part, a transmitter and a receiver. The transmitter includes, in part, a beam processor adapted to receive an optical signal and generate N optical signals in response. The difference between phases of optical signals $a_M$ and $a_{(M+1)}$ is the same for all Ms, where M is an integer ranging from 1 to N−1. The transmitter further includes, in part, N radiating elements each adapted to transmit one of the N optical signals. The spacing between adjacent radiating elements is defined by a first integer multiple of half of a wavelength of the optical signals being transmitted.

The receiver includes, in part, K optical receive elements in which the spacing between each pair of adjacent receive elements is defined by a second integer multiple of the half of the wavelength of the received optical signal, a signal splitter adapted to split a reference signal into K reference optical signals, K mixers each adapted to mix a different one of the K reference optical signals with a different one of the K optical signals received by the K optical receive elements. The K mixers supply, in response, K current signals. The receiver further includes, in part, K analog-to-digital converters each receiving a different one of the K current signals and generating a digital signal in response, and a signal processor adapted to form an image of an object using the K digital signals. The first integer multiple and the second integer multiple form a co-prime number.

A method of transmitting optical signals, in accordance with one embodiment of the present invention, includes, in part, receiving an optical signal by each of K beam processors. The method further includes, in part, generating, by each of the K beam processors, N optical signals in response to the received optical signal. The difference between phases of optical signals $a_{LM}$ and $a_{L(M+1)}$ is the same for all Ms, where M is an integer ranging from 1 to N−1 defining the signals generated by a beam processor, and L is an integer ranging from 1 to K defining the beam processor generating K optical signals. The method further includes, in part, combining K optical signals from different ones of the K beam processors to generate N optical signals, and transmitting each of the N optical signals by a different one of N radiating elements.

A method of processing an optical signal received via K optical receive elements, in accordance with one embodiment of the present invention, includes, in part, splitting an optical signal received by each receive element into N optical signals, shifting phases of at least a subset of the N×K optical signals, supplying N groups of output optical signals each including K optical signals selected from a different one of the K split signals, and combining the K optical signals of a different one of the N groups to generate a combined signal.

A method of processing an optical signal received via K optical receive elements, in accordance with one embodiment of the present invention, includes, in part, splitting an optical signal received by each receive element into N optical signals, splitting a reference signal into K×N reference optical signals, shifting phases of at least a subset of the N×K reference optical signals, mixing a different one of the N×K reference optical signals with a different one of the N×K optical signals, and supplying N groups of current signals each including K current signals.

A method of processing an optical signal received via K optical receive elements, in accordance with one embodiment of the present invention, includes, in part, splitting a reference signal into K reference optical signals, mixing a different one of the K reference optical signals with a different one of the K optical signals received by the K optical receive elements thereby to generate K current signals, generating N phase shifted current signals in response to each of the K current signals, and generating a combined current signal in response to receipt of N phase shifted current signals each associated with a different one of the K current signals.

A method of processing an optical signal received via K optical receive elements, in accordance with one embodiment of the present invention, includes, in part, splitting a reference signal into K reference optical signals, mixing a different one of the K reference optical signals with a different one of the K optical signals received by the K optical receive elements thereby to generate K current signals, generating a digital signal in response to each of the K current signals, and forming an image using the K digital signals.

A method of optical communication, in accordance with one embodiment of the present invention, includes, in part, generating N optical signals in response to an optical signal adapted for transmission, wherein a difference between phases of optical signals $a_M$ and $a_{(M+1)}$ is the same for all Ms, where M is an integer ranging from 1 to N−1, transmitting the N optical signals via N radiating elements wherein a spacing between adjacent radiating elements is defined by a first integer multiple of half of a wavelength of the optical signal being transmitted, receiving the transmitted optical signal via K optical receive elements, wherein a spacing between each pair of adjacent receive elements is defined by a second integer multiple of the half of the wavelength of the received optical signals, splitting a reference signal into K reference optical signals, mixing each of a different one of the K reference optical signals with a different one of the K optical signals received by the K optical receive elements thereby to supply K current signals, generating a digital signal in response to each current signal, and forming an image using the K digital signals. The first integer multiple and the second integer multiple form a co-prime number.

DETAILED DESCRIPTION OF THE INVENTION

Figure 1:
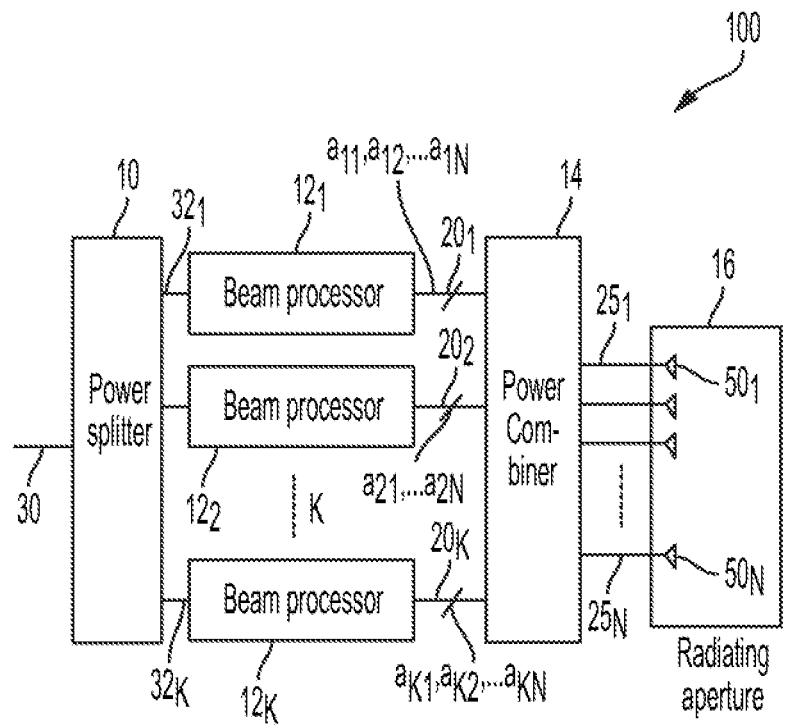
FIG. 1 is a simplified high-level block diagram of a multi-beam phased array transmitter, in accordance with one exemplary embodiment of the present invention.

FIG. 1 is a simplified high-level block diagram of a multi-beam phased array transmitter 100, in accordance with one embodiment of the present invention. Phased array transmitter 100 is shown, as including in part, a power splitter 10, K beam processors $12_i$ where i is an index ranging from 1 to K, a first set of K optical waveguides $20_i$, a power combiner 14, a second set of N optical waveguides $25_j$ where j is an index ranging from 1 to N, and a radiating aperture 16. N in an integer greater than one and K is an integer equal to or greater than one. Although radiating aperture 16 is shown as including a one-dimensional array of radiators $50_i$, it is understood that in other embodiments, radiating aperture 16 may include a two-dimensional array of radiators $50_i$. It is understood that the arrays may be uniform or non-uniform.

Power splitter 10 is adapted to receive and split the received optical signal 30 into K optical signals $32_i$ each delivered to a different one of the K beam processors $12i$. For example, beam processor $12_1$ is shown as receiving optical signal $32_1$, and beam processor $12_K$ is shown as receiving optical signal $32_K$.

Each beam processor $12_i$ (alternatively referred to herein as system 12) splits the optical signal the phased array receives into N optical signals each delivered through a different waveguide. For example, optical signal $32_1$ is split into N optical signals, namely optical signals $a_{11}, a_{12} \ldots a_{1N}$, by beam processor $12_1$. Similarly, optical signal $32_K$ is split into N optical signals, namely optical signals $a_{K1}, a_{K2} \ldots a_{KN}$, by beam processor $12_K$. Each of optical signals $a_{11}, a_{12} \ldots a_{1N}$ travels through a different one of N waveguides collectively shown in FIG. 1 as $20_1$. Each of optical signals $a_{k1}, a_{k2} \ldots a_{kN}$ travels through a different one of N waveguides collectively shown in FIG. 1 as $20_k$.

For each such optical signal $a_{LM}$, the first index L represents the row number in which the beam processor is disposed, and the second index M represents the index number of the signal that is split from signal $32_L$. For example, signal $a_{12}$ represents the second signal that is split from signal $32_1$ by beam processor $12_1$, and signal $a_{1N}$ represents the $N^{th}$ signal that is split from signal $32_1$ by beam processor $12_1$. Similarly, signal $a_{K1}$ represents the first signal that is split from signal $32_K$ by beam processor $12_K$, and signal $a_{kN}$ represents the $N^{th}$ signal that is split from signal $32_K$ by beam processor $12_k$.

In one embodiment, associated optical signals (i.e., optical signals that have the same first index such as $a_{11}$, $a_{12} \ldots a_{1N}$) whose second indices differ by one, such as signals $a_{11}, a_{12}$ or signals $a_{LM}$ and $a_{(L)(M+1)}$, have the same phase difference. Therefore, the difference between the phases of optical signals $a_{LM}$ and $a_{L(M+1)}$ is the same for all Ms, where M is an integer ranging from 1 to N−1, and L is an integer ranging from 1 to K. In other words, if the difference between the phases of signals $a_{11}$ and $a_{12}$ is φ, the difference between the phases of signals $a_{12}$ and $a_{13}$ is also φ, and the difference between the phases of signals $a_{1(N-1)}$ and $a_{1N}$ is also φ. Similarly, if the difference between the phases of signals $a_{21}$ and $a_{22}$ is Ω, the difference between the phases of signals $a_{22}$ and $a_{23}$ is also Ω, and the difference between the phases of signals $a_{2(N-1)}$ and $a_{2N}$ is also Ω. The phase of each optical signal can be arbitrarily adjusted.

In the following, an optical signal and the waveguide through which the optical signal travels may be identified using the same reference number. For example, reference number $25_1$ may be used to refer to the waveguide identified as such in FIG. 1, or to the optical signal that travels through this waveguide. Power combiner 14 is adapted to receive the N×K optical signals delivered thereto by waveguides $20_1 \ldots 20_K$, each of which includes N waveguides as described above. In response, power combiner 14 generates N optical signal $25_1, 25_2 \ldots 25_N$. Optical signal $25_1$ is generated (by power combiner 14) by combining the K associated optical signals $a_{11}, a_{21} \ldots a_{K1}$. Similarly, optical signal $25_2$ is generated by combining the K associated optical signals $a_{12}, a_{22} \ldots a_{K2}$; and optical signal $25_N$ is generated by combining the K associated optical signals $a_{1N}, a_{2N} \ldots a_{KN}$. Each of the N optical signal $25_1, 25_2 \ldots 25_N$ is delivered to a different one of N radiating elements $50_1$, $50_2 \ldots 50_N$ of radiating aperture 16 for transmission. For example, optical signal $25_1$ is delivered to radiating element $50_1$, and optical signal $25_N$ is delivered to radiating element $50_N$. Optical phased array transmitter 100 has thus at least K optical beams that may be independently modulated for transmission with the desired signal waveform or data.

Figure 2:
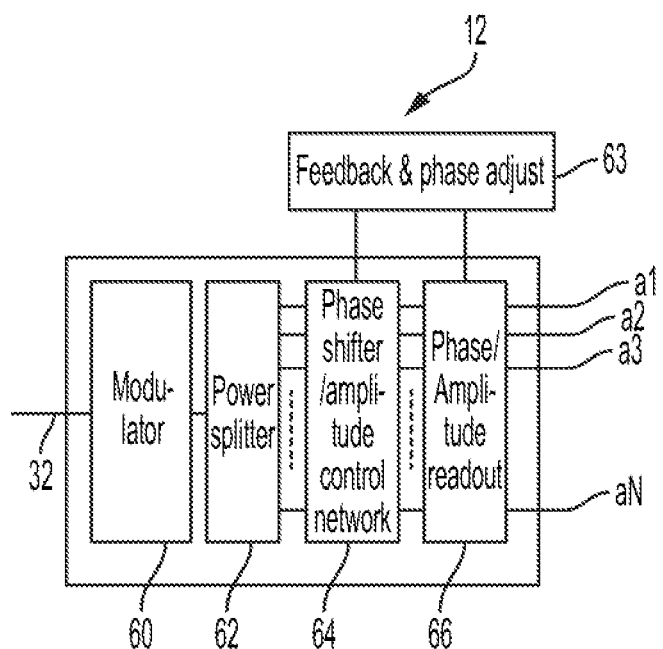
FIG. 2 is a simplified high-level block diagram of the beam processors shown in FIG. 1.

FIG. 2 is a simplified high-level block diagram of the beam processor 12 of FIG. 1. Beam processor 12 is shown as including, in part, a modulator 60, a power splitter 62, a phase shifter/amplitude control network 64, and a phase/amplitude measurement block 66. Modulator 60 is adapted to modulate the amplitude, and/or phase of the received optical signal 32. Power splitter 62 is adapted to split the modulated optical signal into N different optical signals each of which may be independently phase shifted and amplitude adjusted by an associated phase shifter and amplitude modulator disposed in phase shifter/amplitude control network 64. The amplitude and phase of each of the output signals of phase shifter network/amplitude control 64 is sampled and supplied by an associated phase/amplitude measurement unit disposed in block 66 and delivered as one of the N output signals, such as signals $a_{11}, a_{12} \ldots a_{1N}$ of the beam processor.

Figure 3:
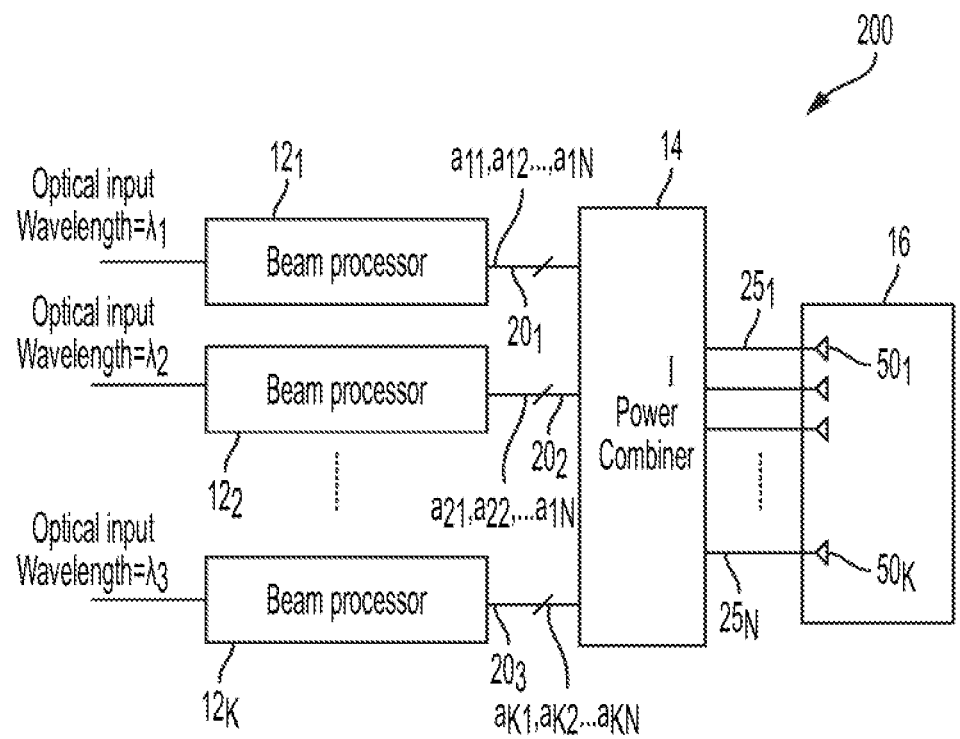
FIG. 3 is a simplified high-level block diagram of a multi-beam phased array transmitter, in accordance with one exemplary embodiment of the present invention.

FIG. 3 is a simplified high-level block diagram of a multi-beam phased array transmitter 200, in accordance with another embodiment of the present invention. Phased array transmitter 200 is shown, as including in part, K beam processors $12_i$ where i is an index ranging from 1 to K, a first set of K optical waveguides $20i$, a power combiner 14, a second set of N optical waveguides $25_j$ where j is an index ranging from 1 to N, and a radiating aperture 16. K and N are integers greater than one. Multi-beam phased array transmitter 200 is similar to multi-beam phased array transmitter 100 except that in multi-beam phased array transmitter 200, each beam processor $12_K$ receives an optical signal with a different wavelength. For example, beam processor $12_1$ is shown as receiving an optical signal having a wavelength $\lambda_1$, beam processor $12_2$ is shown as receiving an optical signal having a wavelength $\lambda_2$ and beam processor $12_K$ is shown as receiving an optical signal having a wavelength $\lambda_K$.

Referring to FIG. 2, modulator 60 is adapted to provide amplitude modulation, phase modulation, and/or shift the frequency of the received optical signal received by the modulator. In one embodiment, modulator 60 may be a single side-band (SSB) modulator. Such an SSB modulator may include a multitude of SSB modulators that are coupled in series to shift the optical frequency to a larger value than the bandwidth of a single modulator. The modulator and phase shifter/amplitude control network may be driven by an on-chip or off-chip electronic circuitry. Such off-chip circuitry may be flipped on the photonic chip to increase the modulation bandwidth. However, if a high bandwidth is not required, the photonic and the electronic circuitry chips may be connected to one another in a printed circuit board to further reduce the cost. The electrical modulation signal may be a chirp or another modulation signal for LiDAR applications. For wireless optical communication, the data may be used as the modulating signal.

Figure 4A:
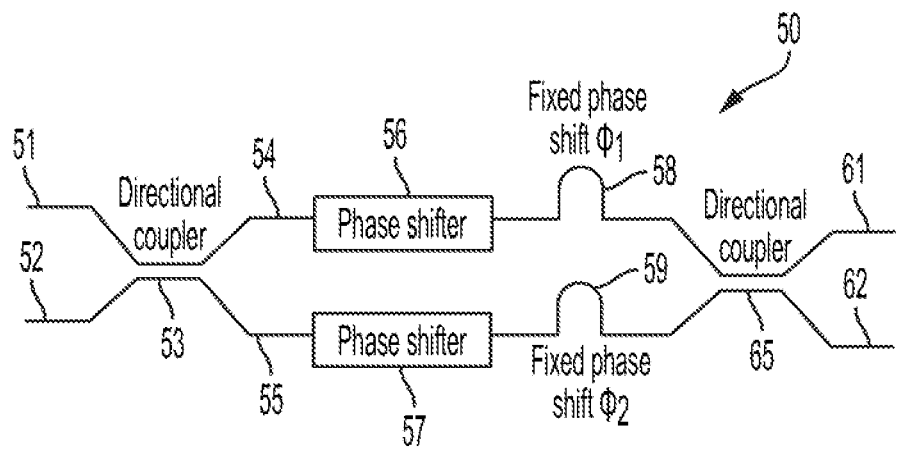
FIG. 4A is a simplified block diagram of a 1-to-2 splitter.

Power splitter 62 may have a tree structure adapted to receive an optical input and provide several output branches with arbitrary power ratios. In one embodiment in which uniform power at each branch is needed, a Y-splitter chain may be used. In another embodiment with uniform power distribution, an MMI (multi-mode interference) splitter chain may be used. In one embodiment, to achieve arbitrary power splitting ratios, a directional coupler followed by two phase shifters, followed by a directional coupler is designed as a 1-to-2 splitter, as shown in FIG. 4A. A chain of these splitters is then used to split the power into many branches.

Each beam processor is adapted to generate multiple beams through controlling the phase and amplitude of the optical signals it received. For example, assume two single beams are desired with the first beam having a relative phase of $\phi_i$ and amplitude of $A_i$, and the second beam having a relative phase of $\psi_i$, and amplitude of $B_i$. To form both beams concurrently, the amplitude of $C_i$ and the phase of $\theta_i$ are adjusted such that:

$$C_i = \sqrt{A_i^2 + B_i^2 + 2AB\cos(\phi_i - \psi_i)}$$

$$\theta_i = \arctan\left(\frac{B_i}{A_i}\right)$$

FIG. 4A is a simplified block diagram of a 1-to-2 splitter 50, adapted to provide arbitrary amplitude ratios at the output branches. Optical signals received from waveguides 51, 52 are delivered to waveguides 54, 55 through direction coupler 53. Phase shifters 56 and 57 are adapted to shift the phases of the signal travelling through waveguides 54 and 55, respectively. The phase of the signal at the output of phase shifter 56 undergoes additional fixed phase shift by fixed phase shifter 58, and he phase of the signal at the output of phase shifter 57 undergoes additional fixed phase shift by fixed phase shifter 59. Directional coupler 65 delivers the phase shifted signals received from fixed phase shifters 58, 59 to waveguides 61 and 62. In yet other embodiments, the phase shifters 56 and 57 are eliminated and the fixed phase differences provided by phase shifters 58, 59 are selected for each 1-to-2 splitter so as to achieve Chebyshev amplitude distribution and provide a fixed power ratio for the output branches.

In one embodiment, specific splitters with specific split ratios are designed for each stage to achieve Chebyshev ratios. In yet other embodiments in which multiple wavelengths are used, such as that shown in FIG. 3, a wavelength sensitive power splitter is used to direct each wavelength into a specific waveguide.

In one embodiment, each phase shifter in phase shifter network 64 is a PiN diode phase shifter. In another embodiment, each such phase shifter is a polymer phase shifter adapted to operate based on the nonlinearity of the polymer material.

Referring to FIG. 2, phase/amplitude measurement block 66 is adapted to measure the amplitude and phase of the optical signals it receives from the waveguides. To achieve this, in one embodiment, each phase/amplitude measurement unit disposed in block 66 samples a portion of the optical signals it receives from a waveguide to determine the relative amplitudes and phases of the optical signals travelling through that waveguide. The measured amplitude and phase values are then used by the feedback and phase adjust block 63 to adjust the phase and amplitude of each waveguide to the desired value.

Figure 4B:
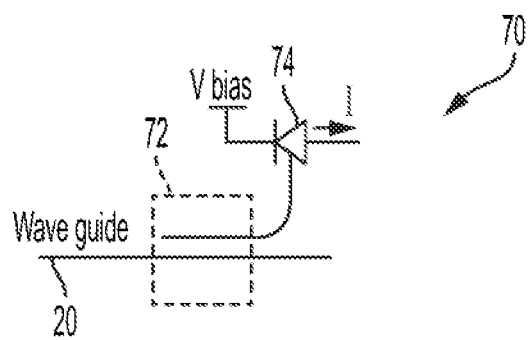
FIG. 4B is a simplified schematic diagram of an amplitude measurement unit disposed in a multi-beam phased array transmitter, in accordance with one embodiment of the present invention.

FIG. 4B is a simplified schematic diagram of an amplitude measurement unit 70, in accordance with one embodiment of the present invention. Amplitude measurement unit 70 (alternatively referred to herein as sampling cell) is shown as including, in part, an optical signal coupler (alternatively referred to herein as sampler) 72 and a photo-diode 74. Optical signal coupler 72 is adapted to receive a portion of the optical signal travelling through waveguide 20 and deliver the optical signal to photo detector 74. In response, photo detector 72 generates an output current signal I that is used to determine the amplitudes of the optical signal travelling through waveguide 20.

Figure 5:
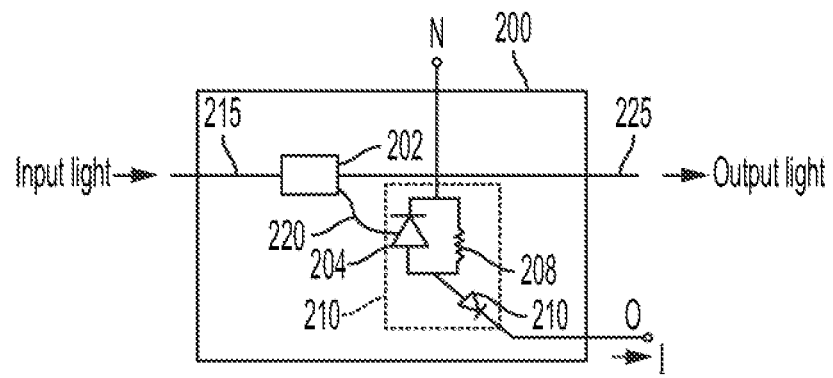
FIG. 5 is a simplified schematic diagram of an amplitude measurement unit disposed in a multi-beam phased array transmitter, in accordance with one embodiment of the present invention.

In some embodiments, the sampling cell is adapted to provide a readout of the amplitude upon application of a voltage. FIG. 5 is a simplified schematic diagram of a sampling cell 200, in accordance with such embodiments of the present invention. Sampling cell 200 is shown as including, in part, an optical sampler (an optical signal coupler) 202, a photodetector 204, a current limiting resistor 208 and a PN junction diode 210. The light received from waveguide 215 is sampled by sampler 202. The remaining portion of the received light is delivered as output light via waveguide 225. The sampled light is delivered to photodetector 204 via waveguide 220 thereby causing a current to be generated in photodetector 204. If a voltage is applied to node N, diode 210 turns on thus causing the current generated by photodetector 204 to be supplied at output node O. If no voltage is applied to node N, diode 210 remains open thereby causing the current generated by photodetector 204 to flow through the loop formed by photodetector 204 and resistor 208. Therefore, by controlling the voltage of node N, the current generated by photodetector 204 may be supplied or inhibited from flowing to output node N.

Figure 6:
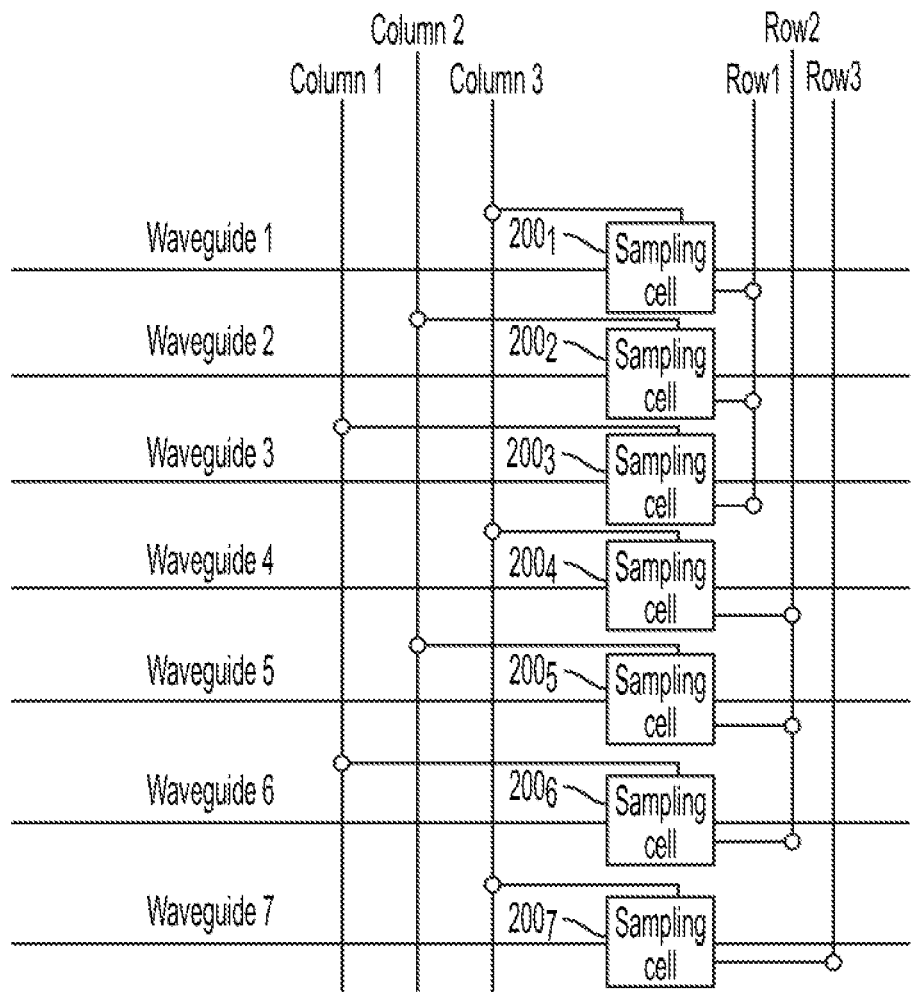
FIG. 6 is a simplified schematic diagram of a multitude of amplitude measurement units forming an array, in accordance with one embodiment of the present invention.

FIG. 6 shows a multitude of sampling cells $200_i$ (i is an index ranging from 1 to 7 in FIG. 5) coupled to 3 column signals and 3 row signals. Each of the column select signals Column1, Column2 (each of which corresponds to node N in FIG. 5) is shown as selecting two of the sampling cells, and signal Column 3 is shown as selecting three of the sampling cells. For example, by applying a voltage to column select signal Column 2, a sample of the light received from waveguide 2 is delivered to Row 1, and a sample of the light received from waveguide 5 is delivered to Row 2. Similarly, by applying a voltage to column select signal Column 3, a sample of the light received from waveguide 1 is delivered to Row 1, a sample of the light received from waveguide 4 is delivered to Row 2, and a sample of the light received from waveguide 7 is delivered to Row 3.

In some embodiments, the optical signals sampled from a pair of branches are combined and applied to a photodiode. The current generated by the photodiode is responsive to the degree of interference between the two optical signals, which in turn, is a measure of the relative phases of the sampled optical signals. Because the product of their amplitudes can be measured by varying their relative phases or by measuring the amplitudes individually, the relative phases of the optical signals is measured.

Figure 7:
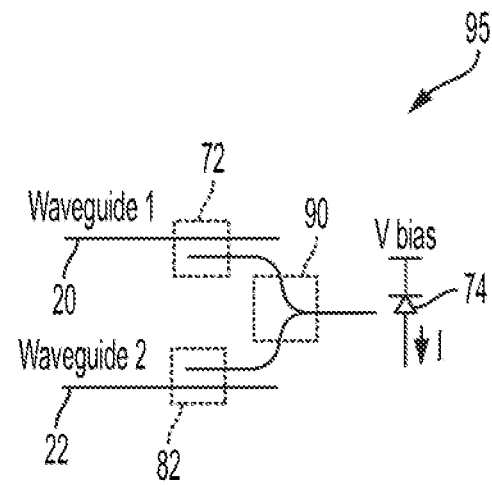
FIG. 7 is a simplified schematic diagram of a phase measurement unit disposed in a multi-beam phased array transmitter, in accordance with one embodiment of the present invention.

FIG. 7 is a simplified schematic diagram of a phase measurement unit 95, in accordance with one such embodiment of the present invention. Phase measurement unit 95 is shown as including, in part, first and second optical samplers 72, 82, optical signal combiner 90, and a photo-diode 74. Optical sampler 72 is adapted to receive a portion of the optical signal travelling through waveguide 20, and optical sampler 72 is adapted to receive a portion of the optical signal travelling through waveguide 22. The optical signals sampled by optical samplers 72, 82 are combined by optical coupler 90 and delivered to photo detector 74. In response, photo detector 74 generates an output current signal I that is used to determine the relative phases of the optical signals travelling through waveguides 20 and 22.

Figure 8:
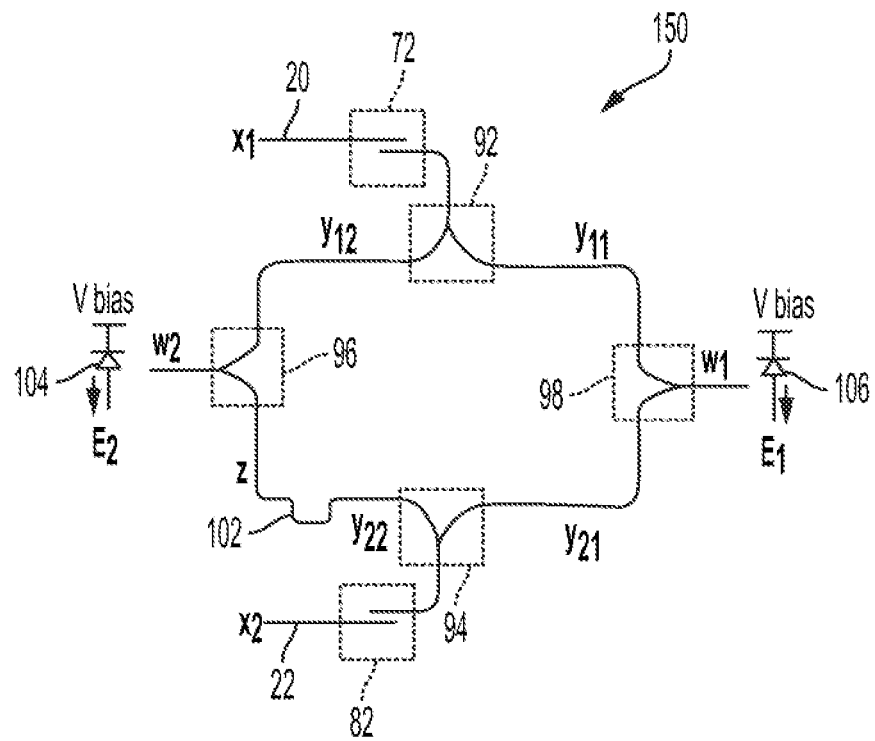
FIG. 8 is a simplified schematic diagram of a phase/amplitude measurement unit disposed in a multi-beam phased array transmitter, in accordance with one embodiment of the present invention.

FIG. 8 is a simplified schematic diagram of a phase/amplitude measurement unit 150, in accordance with another embodiment of the present invention. Optical signal $x_1$ travelling through waveguide 20 is sampled by sampler 72 and split by optical splitter 92 to generate signals $y_{11}$ and $y_{12}$. In a similar manner, optical signal $x_2$ travelling through waveguide 22 is sampled by sampler 82 and split by optical splitter 94 to generate signals $y_{21}$ and $y_{22}$. Phase shifter 102 is adapted to shift the phase of the optical signal $y_{22}$ by 90° to generate signal z. Optical combiner 96 combines optical signals $y_{12}$ and z to generate and deliver signal $w_2$ to photo detector 104. In response, photo detector 104 generates electrical signal $E_2$. Optical combiner 98 combines optical signals $y_{11}$ and $y_{21}$ to generate and deliver signal $w_1$ to photo detector 106. In response, photo detector 106 generates electrical signal $E_1$.

The 90° phase shift generated by phase shifter 102 provides independent interference patterns of the two branches, thereby enabling both the relative amplitude and phases of the two branches to be measured using the output signals of the photodetectors 104, 106, as described further below.

Assume time varying signals $x_1$ and $x_2$ are defined as:

$$x_1(t) = A_1 \cos(\omega t + \phi_1)$$

$$x_2(t) = A_2 \cos(\omega t + \phi_2)$$

Signal $y_{11}$, $y_{21}$, $y_{12}$, $y_{22}$ and z may thus be defined as:

$$y_{11} = y_{12} = \frac{A_1}{\sqrt{2}} \cos(\omega t + \phi_1)$$

$$y_{21} = y_{22} = \frac{A_2}{\sqrt{2}} \cos(\omega t + \phi_2)$$

$$z = \frac{A_2}{\sqrt{2}} \cos\left(\omega t + \phi_2 + \frac{\pi}{2}\right)$$

Therefore, signals $w_1$ and $w_2$ may be defined as:

$$w_1 = y_{11} + y_{21} = \frac{1}{\sqrt{2}}(A_1 \cos(\omega t + \phi_1) + A_2 \cos(\omega t + \phi_2))$$

$$w_2 = y_{12} + z = \frac{1}{\sqrt{2}}\left(A_1 \cos(\omega t + \phi_1) + A_2 \cos\left(\omega t + \phi_2 + \frac{\pi}{2}\right)\right)$$

Electrical signals $E_1$ and $E_2$ may then be defined as:

$$E_1 = \alpha A_1 A_2 \cos(\phi_1 - \phi_2)$$

$$E_2 = \alpha A_1 A_2 \sin(\phi_1 - \phi_2)$$

The difference between the phases $\phi_1$ and $\phi_2$ (i.e., $\phi_1 - \phi_2$), as well the product of the amplitudes $A_1 A_2$ may be defined as:

$$\phi_1 - \phi_2 = arc\, cot(E_1/E_2)$$

$$E_1 = 2A_1 A_2 \cos(\phi_1 - \phi_2).$$

Therefore, by measuring the photo-diode currents and thus $E_1$ and $E_2$, the phase and amplitude of signal $x_2$ may be determined relative to those of signal $x_1$. In a multi-branch system, in a similar manner, the phase and amplitude of signal $x_3$ may be determined relative to those of signal $x_2$, the phase and amplitude of signal $x_4$ may be determined relative to those of signal $x_3$, and the like. Therefore, by taking, for example, signal $x_1$ as a reference signal, the phases and amplitudes of all the other signals relative to those of signal $x_1$ may be determined In accordance with one exemplary embodiment of the present invention, a power splitter network includes an optical sampler in only one branch of each pair of optical branches coupled to the outputs of a 1-to-2 splitter. By sampling and measuring the amplitude of the light delivered to only one output of each 1-to-2 splitter, the amplitude of the light in all branches of the splitter network may be calculated.

Figure 9:
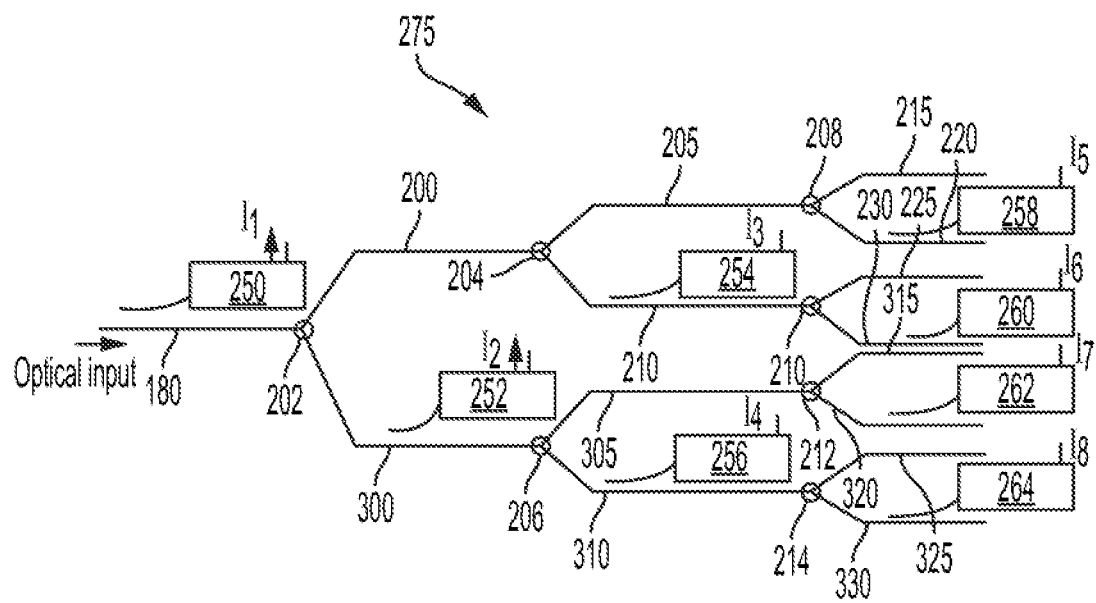
FIG. 9 is a simplified schematic diagram of a power splitter network, in accordance with one such embodiment of the present invention.

FIG. 9 is a simplified schematic diagram of a power splitter network 275, in accordance with one such embodiment of the present invention. Optical signal received through waveguide 180 is split by 1-to-2 splitter 202 and delivered to waveguides or branches 200 and 300 which form the first split level of the optical splitter network 275. As shown, optical signal traveling through waveguide 200 is split by 1-to-2 splitter 204 and delivered to waveguides 205, 210. The optical signal traveling through waveguide 300 is split by 1-to-2 splitter 206 and delivered to waveguides 305 and 310. Waveguides 205, 210, 305 and 310 form the second split level of the optical splitter network 275.

The optical signal traveling through waveguide 205 is split by 1-to-2 splitter 208 and delivered to waveguides 215 and 220; the optical signal traveling through waveguide 210 is split by 1-to-2 splitter 210 and delivered to waveguides 225 and 230; the optical signal traveling through waveguide 305 is split by 1-to-2 splitter 212 and delivered to waveguides 315 and 320; and the optical signal traveling through waveguide 310 is split by 1-to-2 splitter 214 and delivered to waveguides 325 and 330. Waveguides 215, 220, 225, 230, 315, 320, 325 and 330 form the third split level of the optical splitter network 275. Waveguides 200, 205, 305, 215, 225, 315 and 325 form the upper branches of the power splitter network, and waveguides 300, 210, 310, 220, 230, 320 and 330 form the lower branches of the power splitter network Although power splitter network 275 is shown as including three split levels, it is understood that a power splitter network in accordance with embodiments of the present invention, may have any number of split levels, which may be more or fewer than 3 levels.

Power splitter network 275 is also shown as including, in part, optical sampler 250 sampling the optical signal in waveguide 180; optical sampler 252 sampling the optical signal in waveguide 300; optical sampler 254 sampling the optical signal in waveguide 210; optical sampler 256 sampling the optical signal in waveguide 310, optical sampler 258 sampling the optical signal in waveguide 220; optical sampler 260 sampling the optical signal in waveguide 230; optical sampler 262 sampling the optical signal in waveguide 320; and optical sampler 264 sampling the optical signal in waveguide 330. Accordingly, as shown in FIG. 9, power splitter network 275 includes only one optical sampler at the output of each 1-to-2 splitter. By sampling and measuring the amplitude of the light travelling through waveguides 180, 300, 210, 310, 220, 230, 320 and 330 (the lower branches of the network), the amplitude of the optical signal in waveguides 200, 205, 305, 215, 225, 315 and 325 (the upper branches of the network) can also be determined, as described above.

Figure 10:
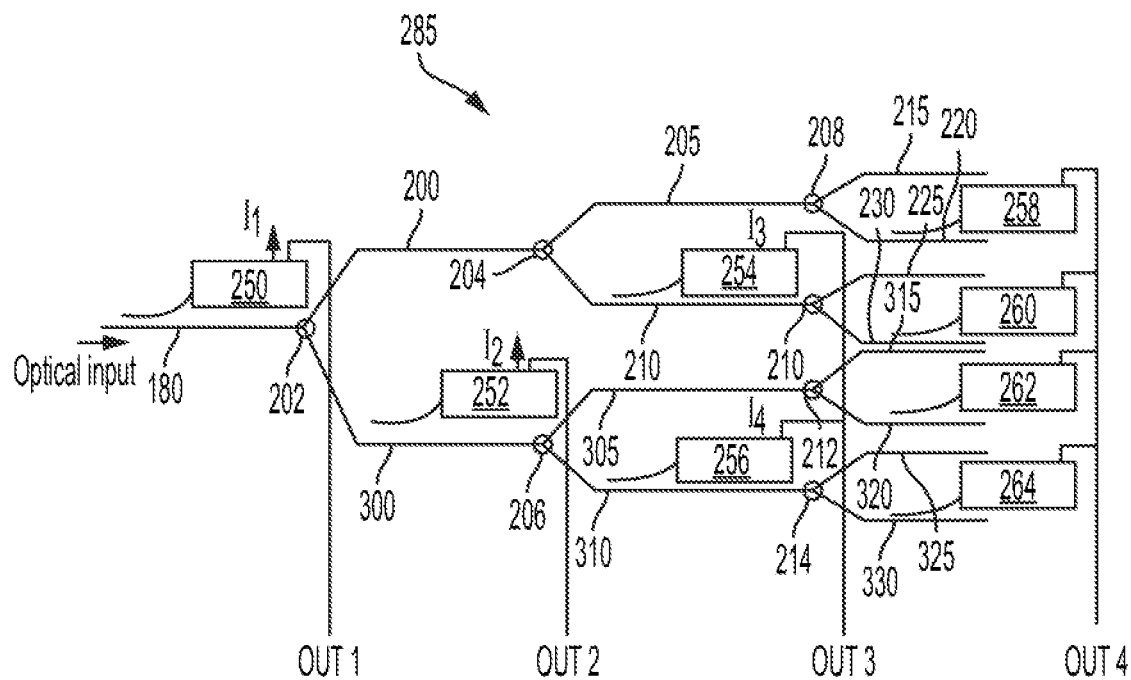
FIG. 10 is a simplified schematic diagram of a power splitter network, in accordance with one such embodiment of the present invention.

FIG. 10 is a simplified schematic diagram of a power splitter network 285, in accordance with another embodiment of the present invention. Power splitter network 285 is similar to power splitter network 275 except that in power splitter network 285, the output terminals of the samplers at each split level are connected to one another. Accordingly, the outputs of samplers 254 and 256 disposed in the second split level are connected to one another to from output signal Out3. Similarly, the outputs of samplers 258, 260, 262 and 264 disposed in the third split level are also connected to one another to from output signal Out4. The output signal of sampler 250 forms the first output signal Out1, and the output signal of sampler 252 disposed in the first split level forms the second output signal Out2.

In some embodiments of power splitter network 285, each of the 1-to2 splitters is a dynamic splitter adapted to change the ratio of the amplitudes of the signals the splitter delivers to its two outputs. For example, 1-to-2 splitter 204 may be dynamically varied to deliver more power to waveguide 205 than it does to waveguide 210. Similarly, 1-to-2 splitter 212 may be dynamically varied to deliver more power to waveguide 320 than it does to waveguide 315. By using dynamically variable splitters, the power splitter network may be calibrated to account for fabrication mismatches. In one embodiment, the calibration may be performed as described below.

The amplitude of the input light is measured at output signal at Out1. Splitter 202 is adjusted to maximize the signal at out2. Accordingly, the Splitter transfers all the optical light it receives towards the lower branch. Then Splitter 202 is tuned to minimize the power reaching signal Out2. Accordingly, all the received power is transferred to the upper branch. Having the two measurements, the voltage range (and thus the offset voltage) required for full switching and the extinction ratio of the Splitter 202 are calculated.

Using Splitter 202, the optical power is fully switched to the lower branch. Therefore, no power goes to the upper branch and thus optical sampler 254 outputs a value of zero. Accordingly, signal Out3 is the output of optical sampler 256. Using a similar procedure, Splitter 206 is calibrated. Next, Splitter 202 is switched to send the light to the upper branch and thus optical sampler 256 outputs a zero value. Accordingly, signal Out3 is supplied by optical sampler 254. Using the same procedure described above, splitter 204 is calibrated. The same procedure is repeated for the rest of the branches to calibrate all the splitters.

Figure 11:
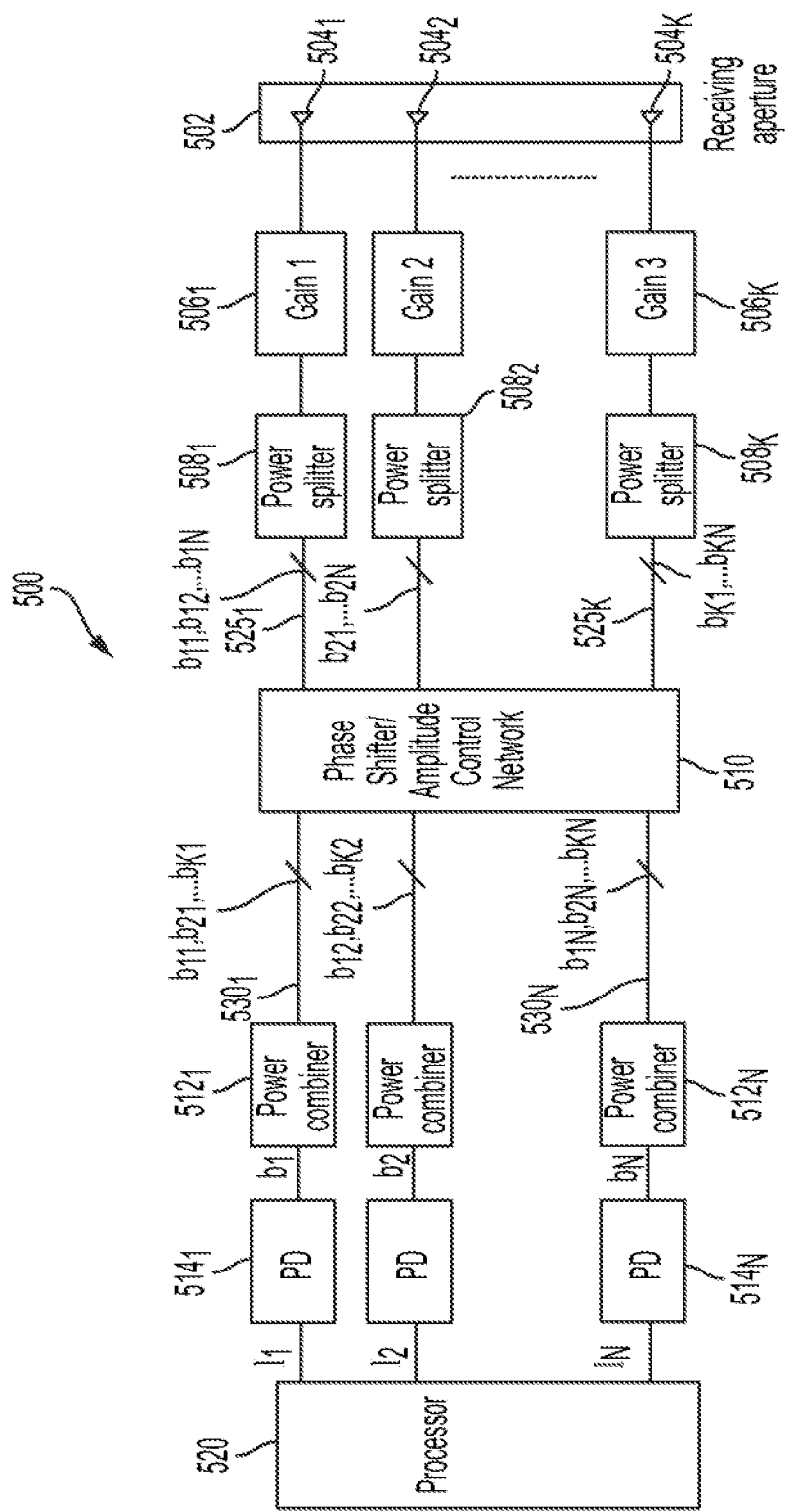
FIG. 11 is a simplified high-level block diagram of a multi-beam phased array receiver, in accordance with one exemplary embodiment of the present invention.

FIG. 11 is a simplified high-level block diagram of a multi-beam phased array receiver 500, in accordance with one exemplary embodiment of the present invention. Phased array receiver 500 is shown as including, in part, a receiver aperture 502 having K receiving elements 504$i$, where i is an index varying from 1 to K, K optical gain stages 506$i$, K optical power splitters 508$_i$, a phase shifter/amplitude control network 510, N power combiners 512$_J$ where J is an index varying from 1 to N, N photo detectors 514$_J$, and a data/signal processor 520. Although receiver aperture 502 is shown as including a one-dimensional array of receiving elements 502$i$, it is understood that in other embodiments, receiver aperture 16 may include a two-dimensional array of receiving elements 504$_i$.

The light incident on the aperture is received by optical receiving aperture 502. Receiving aperture 502 is shown as including, in part, K optical receiving elements 504$_i$. It is understood that the light incident on the aperture may be directly transmitted by a transmitter. Alternatively, the light incident on the aperture may be reflected off an illuminated object. The receiver can form a transceiver with a transmitter, as described in accordance with any of the above embodiments.

The optical signal received by each optical receiving element is optionally amplified by an associated optical gain stage. For example, the optical signal received by optical receiving element 504$_1$ is optically amplified by optical gain stage 506$_1$, and the optical signal received by optical receiving element 504$_K$ is optically amplified by optical gain stage 506$_K$. Each amplified optical signal is shown as being split into N optical signal by an associated power splitter. For example, power splitter 508$_1$ is shown as splitting the optical signal received by optical receiving element 504$_1$ into N optical signals $b_{11}, b_{12} \ldots b_{1N}$, similarly, power splitter 508$_K$ is shown as splitting the optical signal received by optical receiving element 504$_K$ into N optical signals $b_{K1}, b_{K2} \ldots b_{KN}$.

Each of the optical signals $b_{11}, b_{12} \ldots b_{1N}$ travels through a different one of N optical waveguides collectively shown in FIG. 11 as 525$_1$. Similarly, each of the optical signals $b_{K1}, b_{K2} \ldots b_{KN}$ travels through a different one of N optical waveguides collectively shown in FIG. 1 as 525$_K$. For each optical signal $b_{LM}$, the first index L represents the row number in which the power splitter is disposed, and the second index M represents the index number of the optical signal that is split from the signal received by that power splitter, where L is an integer varying from 1 to K, and M is an integer varying from 1 to N. For example, signal $b_{12}$ represents the second signal that is supplied by power splitter 508$_1$, and signal $b_{KN}$ represents the $N^{th}$ signal that is supplied by power splitter 508$_K$.

Phase shifter/amplitude control network 510 is adapted to generate a relative phase shift and amplitude such that the associated optical signals (i.e., optical signals that have the same second index number such as $b_{11}, b_{21} \ldots b_{k1}$) whose first indices differ by one, such as signals $b_{11}, b_{21}$ or signals $b_{LM}$ and $b_{(L+1)M}$ have the same phase difference. In other words, phase shifter/amplitude control network 510 generates a relative phase difference such that the difference between the phases of optical signals $b_{LM}$ and $b_{(L+1)M}$ is the same for all Ls, where L is an integer ranging from 1 to K−1, and M is an integer ranging from 1 to N. Accordingly, if the difference between the phases of signals $b_{11}$ and $b_{21}$ is φ, the difference between the phases of signals $b_{21}$ and $b_{31}$ is also φ, and the difference between the phases of signals $b_{(K-1)1}$ and $b_{K1}$ is also φ. Similarly, if the difference between the phases of signals $b_{12}$ and $b_{22}$ is Ω, the difference between the phases of signals $b_{22}$ and $b_{32}$ is also Ω, and the difference between the phases of signals $b_{(K-1)2}$ and $b_{K2}$ is also Ω. Phase shifter/amplitude control network is adapted to deliver signals having the same second index to the same power combiner via K optical waveguides. For example, phase shifter/amplitude control network 510 delivers optical signals $b_{11}, b_{21} \ldots b_{k1}$ via K optical waveguides collectively identifies as 530$_1$ to power combiner 512$_1$. Similarly, phase shifter/amplitude control network 510 delivers optical signals $b_{1N}, b_{2N} \ldots b_{kN}$ via K optical waveguides collectively identifies as 530$_N$ to power combiner 512$_N$.

It is understood that phase shifter network/amplitude control 510 may generate any other desired phase shift and relative amplitude for each of the signals. For example, in some embodiment, the difference between the phases of signals $b_{11}$ and $b_{21}$ may be selected as φ, the difference between the phases of signals $b_{21}$ and $b_{31}$ in such embodiments may be selected to be different than φ. Similarly, while in some embodiments the difference between the phases of signals $b_{12}$ and $b_{22}$ is selected to be Ω, in such embodiments the difference between the phases of signals $b_{22}$ and $b_{32}$ may be selected to be different than Q.

Each power combiner is adapted to combine the optical signals it receives to generate a combined optical signal. For example, optical signal combiner $514_1$ is adapted to combine optical signals $b_{11}$, $b_{21}$ ... $b_{k1}$ to generate optical signal $b_1$ that the power combiner delivers to photo detector $514_1$. Similarly, optical signal combiner $514_N$ is adapted to combine optical signals $b_{1N}$, $b_{2N}$ ... $b_{KN}$ to generate optical signal $b_N$ that the power combiner delivers to photo detector $514_N$. The signals received by each power combiner $512_i$ is representative of the optical signal received by aperture 502 along a given direction. For example, if the phase difference between signal pairs $b_{11}/b_{21}$, $b_{21}/b_{31}$, $b_{(k-1)1}/b_{K1}$ is, e.g. 30 degrees, signals $b_{11}$, $b_{21}$, $b_{31}$ ... $b_{(k-1)1}$, $b_{K1}$ (alternatively referred to herein as channel 1 data corresponding to the second index of these signals) represent the data received by aperture 520 along a direction or directions depending on the element spacing and wavelength of the light. In particular, the reception direction for a 1D aperture is all the real solutions of $2\pi*d*\sin(\theta)/\lambda=30$ degree in which d is the element spacing, λ is the wavelength, and θ is/are the reception direction. Each photodetector $514_j$ is adapted to convert the received optical signal to an associated electrical signal $I_j$. Processor 520 is adapted to receive electrical signals $I_1, I_2 \ldots I_N$ and generate an image of the object illuminated by various embodiment of the phased array optical transmitter described above.

Figure 12:
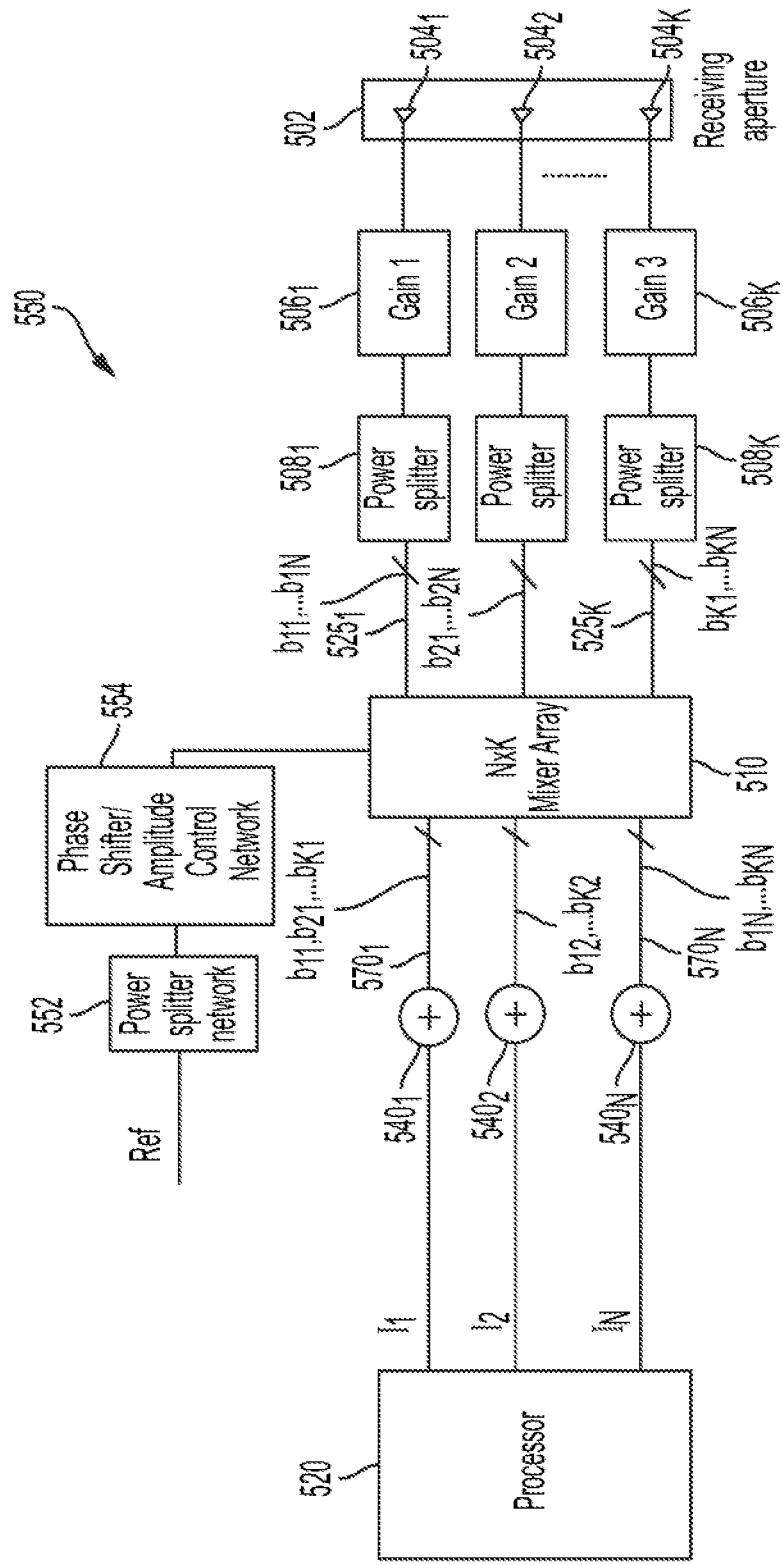
FIG. 12 is a simplified high-level block diagram of a multi-beam phased array receiver, in accordance with one exemplary embodiment of the present invention.

FIG. 12 is a simplified high-level block diagram of a multi-beam phased array receiver 550, in accordance with another exemplary embodiment of the present invention. Phased array receiver 550 is shown as including, in part, a receiver aperture 502 having K receiving elements $504_i$, where i is an index varying from 1 to K, K optical gain stages $506_i$, K optical power splitters $508_i$ adapted to split the optical signal received from each receiver aperture, a power splitter network 552 adapted to split a reference optical signal Ref into N×K optical signals, a phase shifter/amplitude control network 554 having N×K optical phase shifters and amplitude controller each adapted to shift the phase and adjust the amplitude of a different one of the N×K optical signals supplied by the power splitter network 552, an N×K mixer array 510, N current signal summing nodes $540q$, where q is an integer ranging from 1 to N, and a signal/data processor 520.

The light incident on the aperture is received by optical receiving aperture 502. Receiving aperture 502 is shown as including, in part, K optical receiving elements $504i$. It is understood that the light incident on the aperture may be directly transmitted by a transmitter. Alternatively, the light incident on the aperture may be reflected off an illuminated object. The receiver can form a transceiver with a transmitter, as described in accordance with any of the above embodiments.

The optical signal received by each optical receiving element is optionally amplified by an associated optical gain stage. For example, the optical signal received by optical receiving element $504_1$ is optically amplified by optical gain stage $506_1$, and the optical signal received by optical receiving element $504_K$ is optically amplified by optical gain stage $506_K$. Each amplified optical signal is shown as being split into N optical signal by an associated power splitter. For example, power splitter $508_1$ is shown as splitting the optical signal received by optical receiving element $504_1$ into N optical signals $b_{11}, b_{12} \ldots b_{1N}$. Similarly, power splitter $508_K$ is shown as splitting the optical signal received by optical receiving element $504_K$ into N optical signals $b_{K1}, b_{K2} \ldots b_{KN}$.

Each of the optical signals $b_{11}, b_{12} \ldots b_{1N}$ travels through a different one of N optical waveguides collectively shown in FIG. 12 as $525_1$. Similarly, each of the optical signals $b_{K1}, b_{K2} \ldots b_{KN}$ travels through a different one of N optical waveguides collectively shown in FIG. 12 as $525_K$. For each optical signal $b_{LM}$, the first index L represents the row number in which the power splitter is disposed, and the second index M represents the index number of the optical signal that is split from the signal received by that power splitter, where L is an integer varying from 1 to K, and M is an integer varying from 1 to N. For example, signal $b_{12}$ represents the second signal that is by power splitter $508_1$, and signal $b_{KN}$ represents the $N^{th}$ signal that is supplied by power splitter $508_K$.

Power splitter network 552 is adapted to split the reference optical signal Ref into N×K optical signals. Phase shifter/amplitude control network 554 is adapted to shift the phase of the N×K optical signals supplied by the power splitter network 552, adjust their amplitude, and deliver the signals to N×K mixer array 510.

Mixer array 510 has N×K mixers each associated with and adapted to mix one of the optical signals supplied by power splitters $508_1$, $508_2$ ... $508_K$ with one of the N×K optical signals supplied by phase shifter/amplitude control network 554 to generate a current signal whose phase is defined by a difference between the phases of the two optical signals so mixed. Mixer array 510 operates such that the corresponding reference light for the associated signals (i.e., signals that have the same second index number such as $b_{11}, b_{21} \ldots b_{k1}$) whose first indices differ by one, such as signals $b_{11}, b_{21}$ or signals $b_{LM}$ and $b_{(L+1)M}$ have the same phase difference. In other words, phase shifter network 554 generates a relative phase difference such that the difference between the phases of reference signals associated with signals $b_{LM}$ and $b_{(L+1)M}$ is the same for all Ls, where L is an integer ranging from 1 to K–1, and M is an integer ranging from 1 to N. Accordingly, if the difference between the phases of the reference signals associated with signals $b_{11}$ and $b_{21}$ is φ, the difference between the phases of the reference signals associated with signals $b_{21}$ and $b_{31}$ is also φ, and the difference between the phases of the reference signals associated with signals $b_{(K-1)1}$ and $b_{K1}$ is also φ. Similarly, if the difference between the phases of the reference signals associated with signals $b_{12}$ and $b_{22}$ is Ω, the difference between the phases of the reference signals associated with signals $b_{22}$ and $b_{32}$ is also Ω, and the difference between the phases of the reference signals associated with signals $b_{(K-1)2}$ and $b_{K2}$ is also Ω. Mixer array 510 is adapted to deliver signals having the same second index to the same current summing nodes via K conduction paths. For example, mixer array 510 delivers current signals $b_{11}, b_{21} \ldots b_{k1}$ via K conduction paths collectively identified as $570_1$. Similarly, mixer array 510 delivers current signals $b_{1N}, b_{2N} \ldots b_{kN}$ via K different conduction paths collectively identified as $570_N$.

Current signals $b_{11}, b_{21} \ldots b_{k1}$ are added together by current summing node $540_1$ to generate current $I_1$; similarly, current signals $b_{12}, b_{22} \ldots b_{k2}$ are added together by current summing node $540_2$ to generate current $I_2$; and current signals $b_{1N}, b_{2N} \ldots b_{kN}$ are added together by current summing node $540_N$ to generate current $I_N$. Processor 520 is adapted to receive electrical signals $I_1, I_2 \ldots I_N$ and generate an image of the object illuminated by various embodiment of the phased array optical transmitter described above. The phase shift and amplitude of each of the reference signals can be arbitrarily adjusted to form multiple reception beams for a single channel, creating a reception notch for some angles, or any arbitrary reception pattern.

Figure 13:
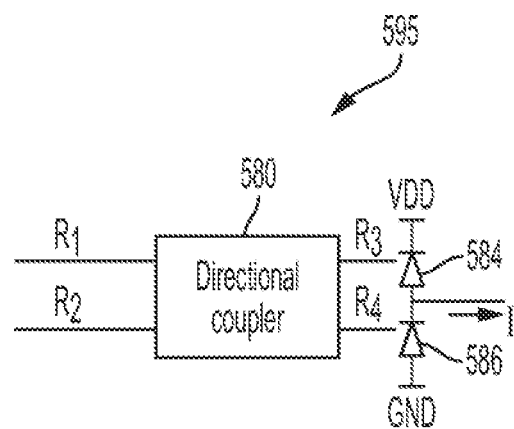
FIG. 13 is a simplified schematic diagram of a mixer disposed in the mixer array of FIG. 12, in accordance with one exemplary embodiment of the present invention.

FIG. 13 is a simplified schematic diagram of a mixer 595 disposed in mixer array 510 of FIG. 12. Mixer 595 is shown as including, in part, a directional coupler 580 and a pair of photo-detectors 582, 584. Directional coupler 580 is shown as receiving signal $R_1$ which is split from the reference signal Ref as described above, and signal $R_2$ which is one of the signals received by matrix array 510. In response, the directional coupler delivers output optical signal $R_3$ to photodetector 584 and output optical signal $R_4$ to photodetector 586. The combined current I generated by the two photo-detectors has a phase defined by a difference between the phases of optical signals $R_1$ and $R_2$.

The resolution of the image formed by processor 520 depends, in part, on the number of beams (N) and the number of optical receiving elements 504 of the receiver aperture 502.

Although not shown, it is understood that in some embodiments the reference optical signal Ref may be modulated to perform mixing in the optical domain or a continuous signal to perform only the down-conversion of the frequency. Using such modulation, the frequency of the reference light may be shifted to achieve a modulated electrical signal at the output of the photodetectors, such as photodetectors 584 and 586.

Figure 14:
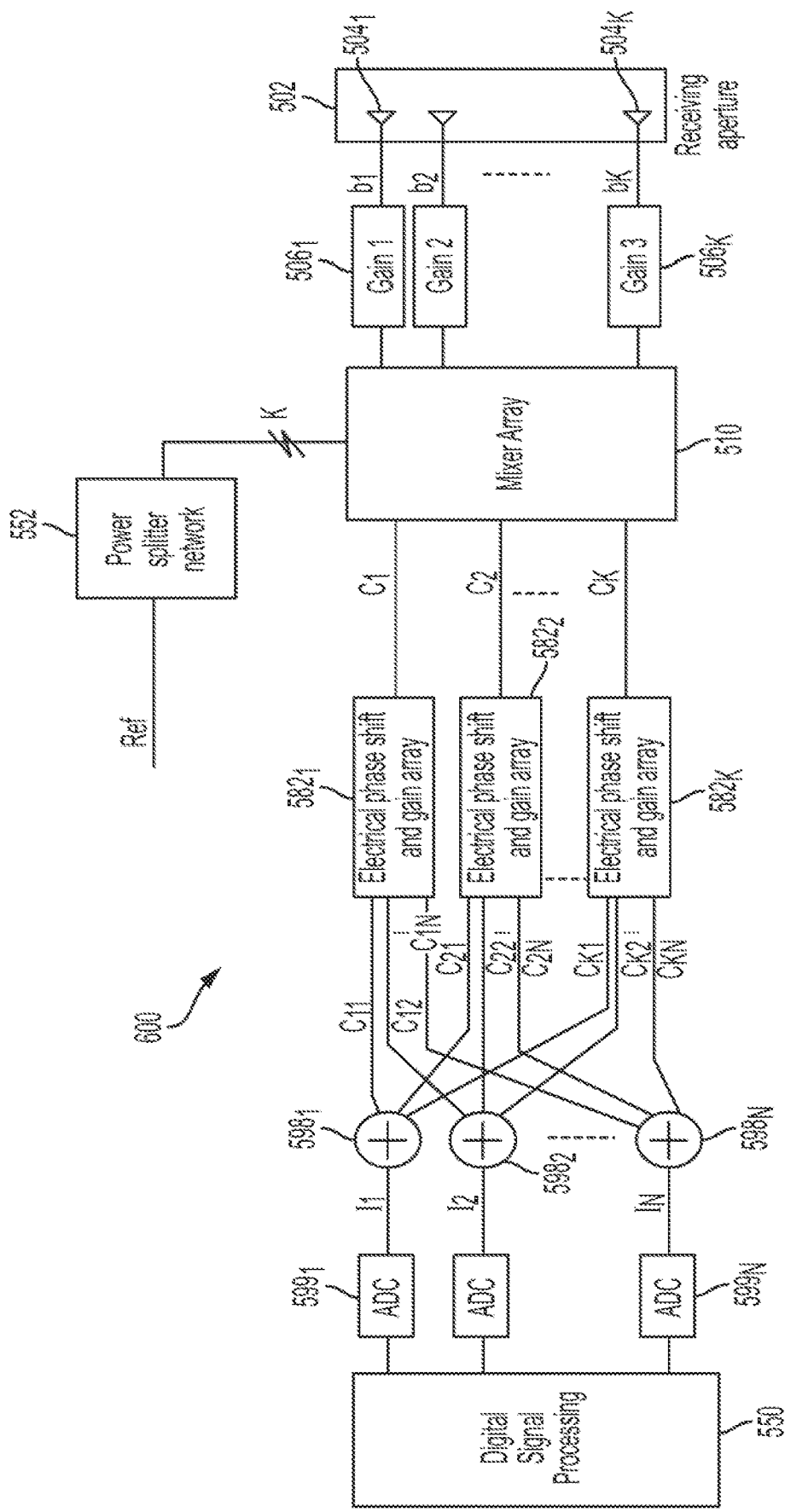
FIG. 14 is a simplified high-level block diagram of a multi-beam phased array receiver, in accordance with one exemplary embodiment of the present invention.

FIG. 14 is a simplified high-level block diagram of a multi-beam phased array receiver 600, in accordance with another exemplary embodiment of the present invention. Multi-beam phased array receiver 600 may be used in beamforming applications, as described further below. Phased array receiver 600 is shown as including, in part, a receiver aperture 502 having K receiving elements 504$i$, where i is an index varying from 1 to K, K optional optical gain stages 506$i$, and a mixer array 510 that includes K mixers.

Phased array receiver 600 is also shown as, in part, a power splitter network 552 that split a reference optical signal Ref into K optical signals. Mixer array 510 is adapted to mix each of the K optical signals received from the aperture 502 with a different one of the K optical signals supplied by power splitter network 552 to generate K mixed signals, namely signals $C_1, C_2 \ldots C_K$. Each of signals $C_1, C_2 \ldots C_K$ is an electrical signal generated using, for example, mixer 595 shown in FIG. 13.

Phased array receiver 600 is also shown as including, in part, K phase shift and gain stages $582_1, 582_2 \ldots 582_K$. Each phase shift and gain stage $582_i$ is adapted to amplify the electrical signals it receives and generate N different electrical signals therefrom each having a different phase. For example, phase shift and gain stage $582_1$ is adapted to generate N different signals $C_{11}, C_{12} \ldots C_{1N}$ with arbitrarily controlled phases and then amplify these signals. For an exemplary beamforming, the difference between the phases of signals $C_{1S}$ and $C_{2S}$ is the same as the difference between the phases of signals $C_{2S}$ and $C_{3S}$, where S is an integer ranging from 1 to N. Therefore, if the difference between the phases of signals $C_{11}$ and $C_{21}$ is φ, the difference between the phases of signal $C_{11}$ and $C_{31}$ is 2φ, and the difference between phases of signals $C_{11}$ and $C_{N1}$ is Nφ. Likewise, if the difference between the phases of signals $C_{12}$ and $C_{22}$ is X, the difference between the phases of signal $C_{12}$ and $C_{32}$ is 2X, and the difference between phases of signals $C_{12}$ and $C_{N2}$ is NX. Similarly, if the difference between the phases of signals $C_{1K}$ and $C_{2K}$ is Ω, the difference between the phases of signal $C_{1K}$ and $C_{3K}$ is 2Ω, and the difference between phases of signals $C_{1K}$ and $C_{NK}$ is NΩ. The phase shift and amplitude gain of each of the signals $C_{LM}$ (L is an integer ranging from 1 to K, and M is an integer ranging from 1 to N in this example) can be adjusted arbitrarily and it is understood that any desired phase and amplitude adjustment can be performed before digital processing.

Phased array receiver 600 is also shown as, in part, N current summing stages each adapted to receive a current signal from a different one of the phase shift and gain stages $582_i$ and add the current signals together. For example, current summing stage $598_1$ is adapted to receive associated electrical signals $C_{11}, C_{21} \ldots C_{N1}$ and add these currents together to generate current $I_1$. Similarly, current summing stage $598_N$ is adapted to receive associated electrical signals $C_{1N}, C_{2N} \ldots C_{KN}$ and add these currents together to generate current $I_N$. Accordingly, in embodiment 600 of the present invention, current summing stage $598_i$ is adapted to receive and sum N current signals $C_{ji}$ to generate current $I_i$ where j is an index ranging from 1 to K, and i is an index ranging from 1 to N. Each current signal $I_i$ is converted to a digital signal by an associated analog-to-digital converted (ADC) $599_i$ and delivered to digital signal processing block (processor) 550. Processor 520 is adapted to receive the digital signals corresponding to electrical signals $I_1, I_2 \ldots I_N$ and generate an image of the object illuminated by various embodiment of the phased array optical transmitter described above. The resolution of the image formed by processor 520 depends, in part, on the number of measurements and the number of optical receiving elements 504 of the receiver aperture 502, as described above with reference to embodiment 500 shown in FIG. 11. It is understood that in other embodiments, the number of receiving elements may be different than the number of current summing stages and the number of ADCs. Processor 50 is adapted to provide additional amplitude and phase shift of the signals it receives, and further combine and process these signals.

Figure 15:
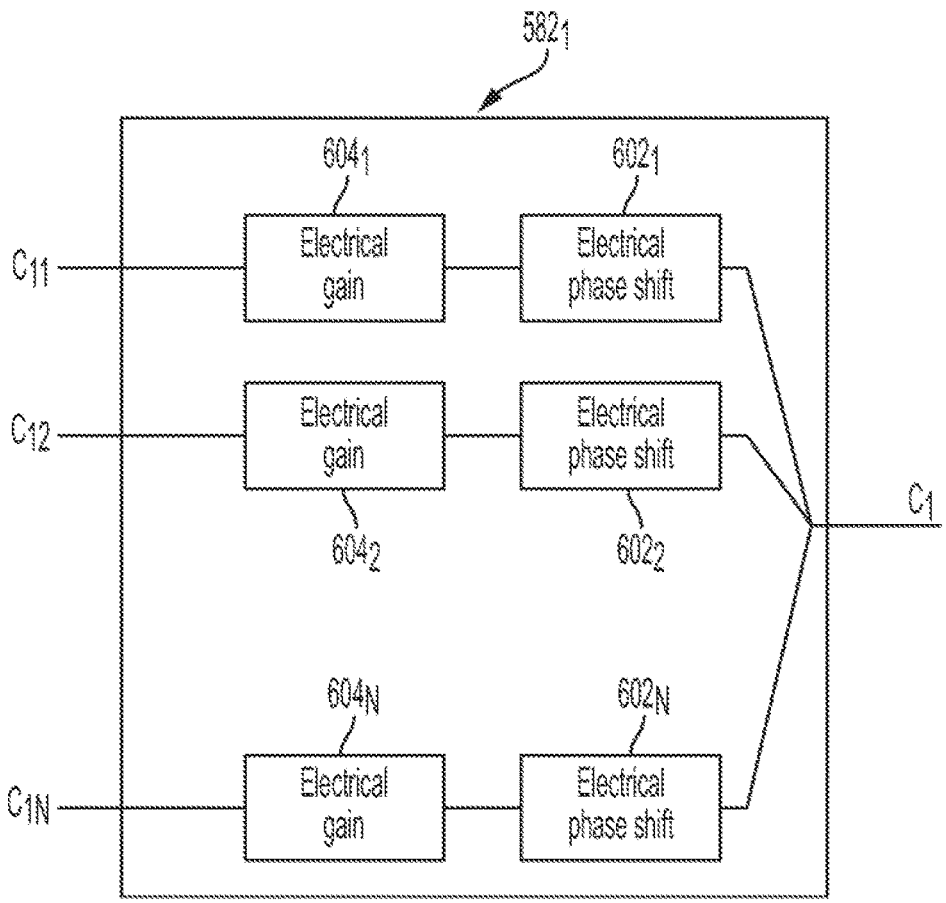
FIG. 15 is a simplified block diagram of an electrical phase shift and gain stage disposed in the phased array receiver of FIG. 14, in accordance with one exemplary embodiment of the present invention.

FIG. 15 is a simplified block diagram of any one of the phase shift and gain stages shown in FIG. 14, such as phase shift and gain stage $582_1$. Phase shift and gain stage $582_1$ is shown as including N electrical phase shift stages $602_1, 602_2 \ldots 602_N$ each supplying a different phase shifted signal to an associated gain stage $604_1, 604_2 \ldots 604_N$. For example, phase shift stage $602_1$ supplies a phase shifted electrical signal to gain stage $604_1$ which in response generates current signal $C_{11}$. Similarly, phase shift stages $602_N$ is adapted to supply a phase shifted electrical signal to gain stage $604_N$ which in response generates current signal $C_{1N}$.

Figure 16:
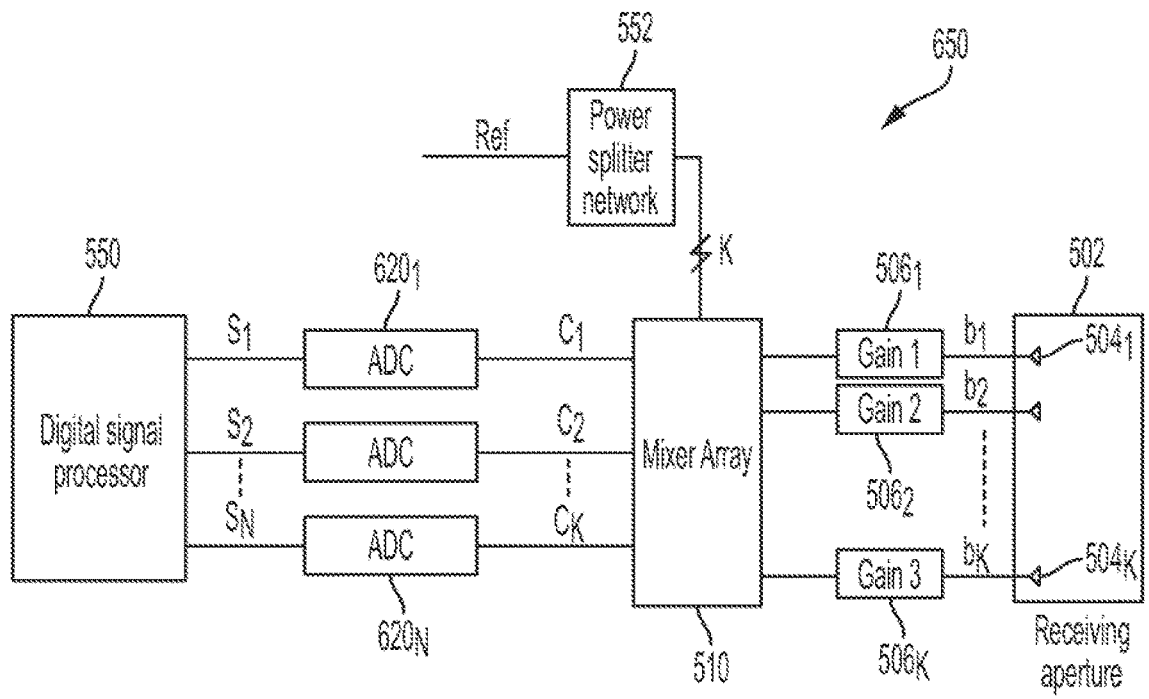
FIG. 16 is a simplified high-level block diagram of a multi-beam phased array receiver, in accordance with one exemplary embodiment of the present invention.

FIG. 16 is a simplified high-level block diagram of a multi-beam phased array receiver 650, in accordance with another exemplary embodiment of the present invention. Multi-beam phased array receiver 650 is similar to a multi-beam phased array receiver 600 shown in FIG. 14, except that multi-beam phased array receiver 650 includes N analog-to-digital converters (ADC) $620_1, 620_2 \ldots 620_N$ each adapted to receive an associated electrical signal from mixer array 510. For example, ADC $620_1$ is adapted to convert current $C_1$ to a digital signal $S_1$. Similarly, ADC $620_N$ is adapted to convert current $C_N$ to a digital signal $S_N$. Digital signal processing block 550 is adapted to receive and shift the signals $S_1 \ldots S_N$, and combine them as necessary to form an image of the object illuminated by various embodiment of the phased array optical transmitter described above. Alternatively, receiver 650 may operate as a stand-alone receiver. The resolution of the image formed by processor 550 depends, in part, on the number of measurements and the number of optical receiving elements 504 of the receiver aperture 502, as described above with reference to embodiment 500 shown in FIG. 11.

In one exemplary embodiment of receiver 650, the beamforming is used to reconstruct the incident light from different angles and collect information of all the illuminated points. In this embodiment, reflection from all the illuminated points are captured at the same time and the entire field of view is reconstructed concurrently. Therefore, ranging and velocity measurement related to all the points are performed substantially at the same time.

Figure 17:
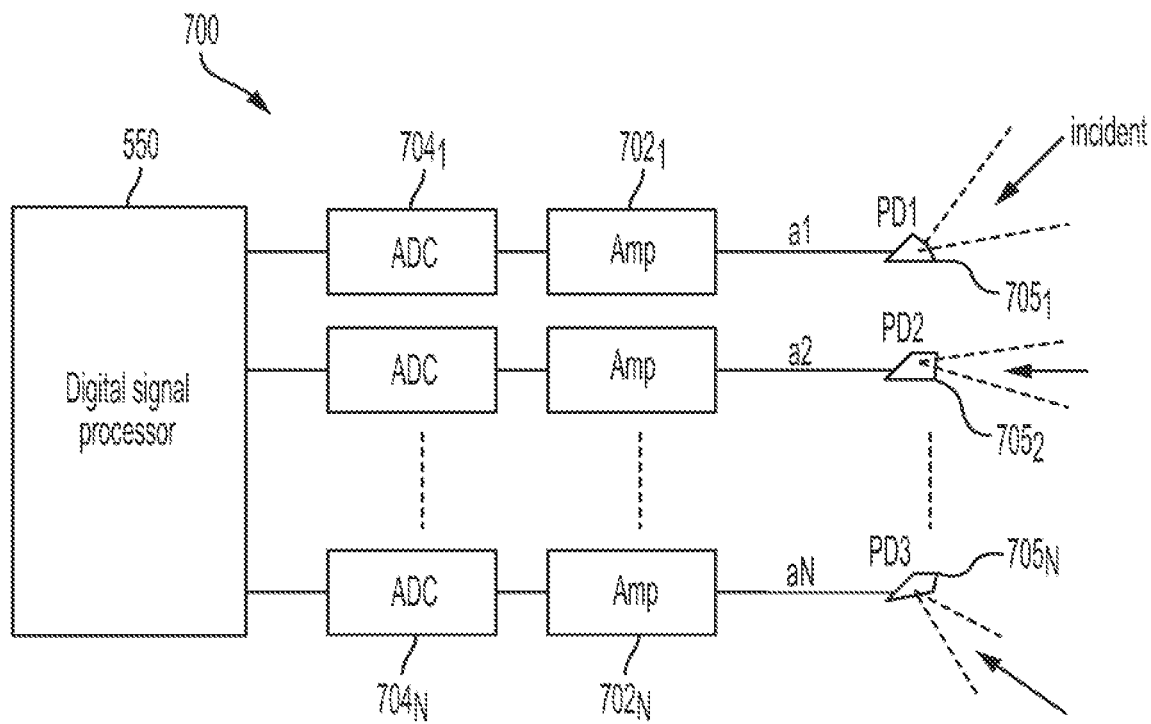
FIG. 17 is a simplified high-level block diagram of a multi-directional receiver, in accordance with one exemplary embodiment of the present invention.

FIG. 17 is a simplified high-level block diagram of a multi-directional receiver 700, in accordance with another exemplary embodiment of the present invention. Multi-directional receiver 700 is shown as including, in part, N photo detectors $705_i$, where i is an index varying from 1 to N, N amplification stages $702_i$, N ADC $704_i$ and digital signal processor 550. Each photo detector has a different field of view such that the entire field of view is covered by the N photo detectors. For example, if N is 4, photo detector $705_1$ may be adapted to have a field of view between 0° and 45°; photo detector $705_2$ may be adapted to have a field of view between 450 and 90°; photo detector $705_3$ may be adapted to have a field of view between 90° and 135°; and photo detector $705_4$ may have a field of view between 135° and 180°. Therefore, receiver 700 is adapted to collect light from multiple angles that may be adjusted to be aligned with the radiation angle of the beams transmitted by multi-beam phased array transmitter, in accordance with any of the embodiments described above. The receiver and transmitter together form a transceiver.

The resolution of the image formed by processor 550 depends, in part, on the number of measurements and the number of photo detectors 705. For example, assume that receiver 700 has 4 photo detectors $705_1$, $705_2$, $705_3$ and $705_4$ each having a 450 field of view. To achieve a resolution of 1 degree, receiver 700 performs 45 different measurements. In a first such measurement, the point illuminated by the transmitter that falls in the field-of-view of photo detector $705_1$ is at 1 degree and photo detector $705_1$ receives light at a 1 degree angle, photo detector $705_2$ receives light at a 46 degrees angle which is illuminated by the second beam of the transmitter, photo detector $705_3$ receives light at receives light at a 91 degrees angle which is illuminated by the third transmitter beam, and, photo detector $705_4$ receives light at a 136 degrees angle which is illuminated by the forth transmitter beam. During a second such measurement, the first transmitter beam is steered to 2 degrees and the photo detector $705_1$ receives light at a 2 degrees angle, photo detector $705_2$ receives light at a 47 degrees angle which is illuminated by the second beam of the transmitter, photo detector $705_3$ receives light at a 92 degrees angle which is illuminated by the third beam of the transmitter, and photo detector $705_4$ receives light at a 137 degrees angle, which is illuminated by the forth beam of the transmitter. Likewise, during the $45^{th}$ measurement, photo detector $705_1$ receives light at a 45 degrees angle which is illuminated by the first beam of the transmitter, photo detector $705_2$ receives light at a 90 degrees angle which is illuminate by the second beam of the transmitter, photo detector $705_3$ receives light at a 135 degree angle which is illuminated by the third beam of the transmitter, and photo detector $705_4$ receives light at a 180 degree angle, which is illuminated by the forth beam of the transmitter. During each such measurement, an image is formed by processor 550 as described above. The images formed during the exemplary 45 measurements are combined by processor 540 to form an image of the object with one degree resolution. Each amplification stage $702_i$ is adapted to amplify the signal it receives and each ADC $704_i$ is adapted to convert the output signal of its associated amplification stage to a digital signal.

Figure 18:
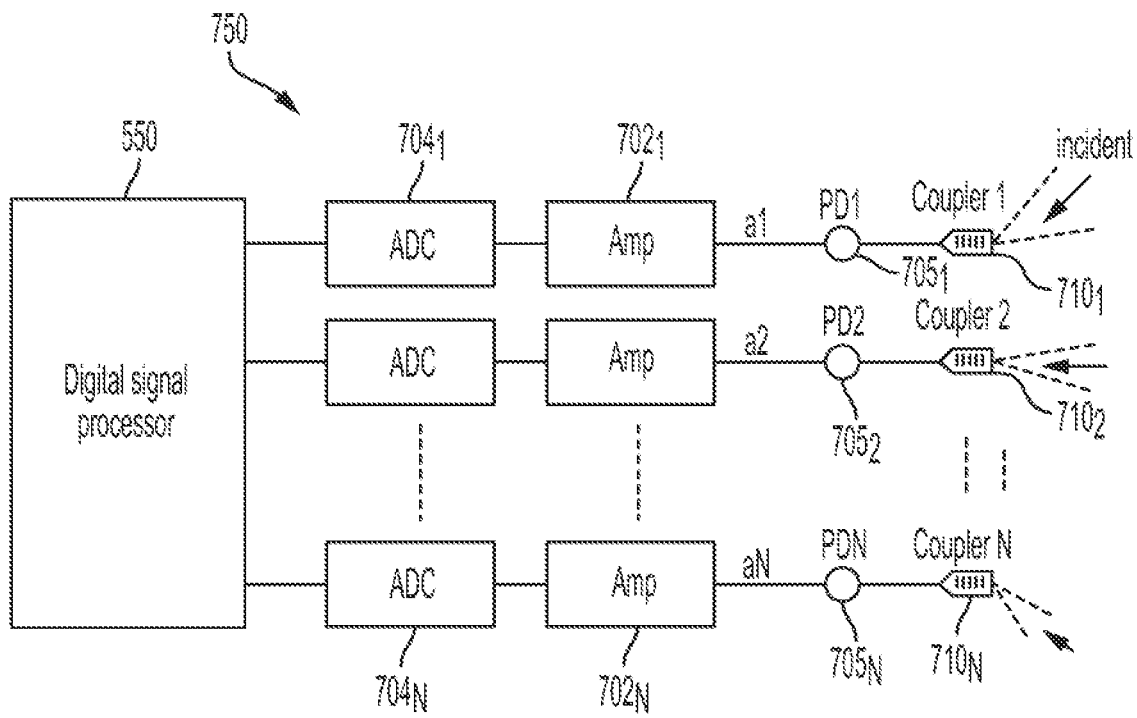
FIG. 18 is a simplified high-level block diagram of a multi-directional receiver, in accordance with one exemplary embodiment of the present invention.

FIG. 18 is a simplified high-level block diagram of a multi-directional receiver 750, in accordance with another exemplary embodiment of the present invention. Multi-directional receiver 750 is similar to multi-directional receiver 700 of FIG. 17 except that receiver 750 receives light incident on the aperture using N grating coupler $710_i$, where i is an integer varying from 1 to N. Each grating coupler 710 has a different field of view such that the entire field of view is covered by the N grating couplers. The optical signal received by each grating coupler $710_i$ is converted to an electrical signal by an associated photo detector $705_i$, as shown.

Figure 19:
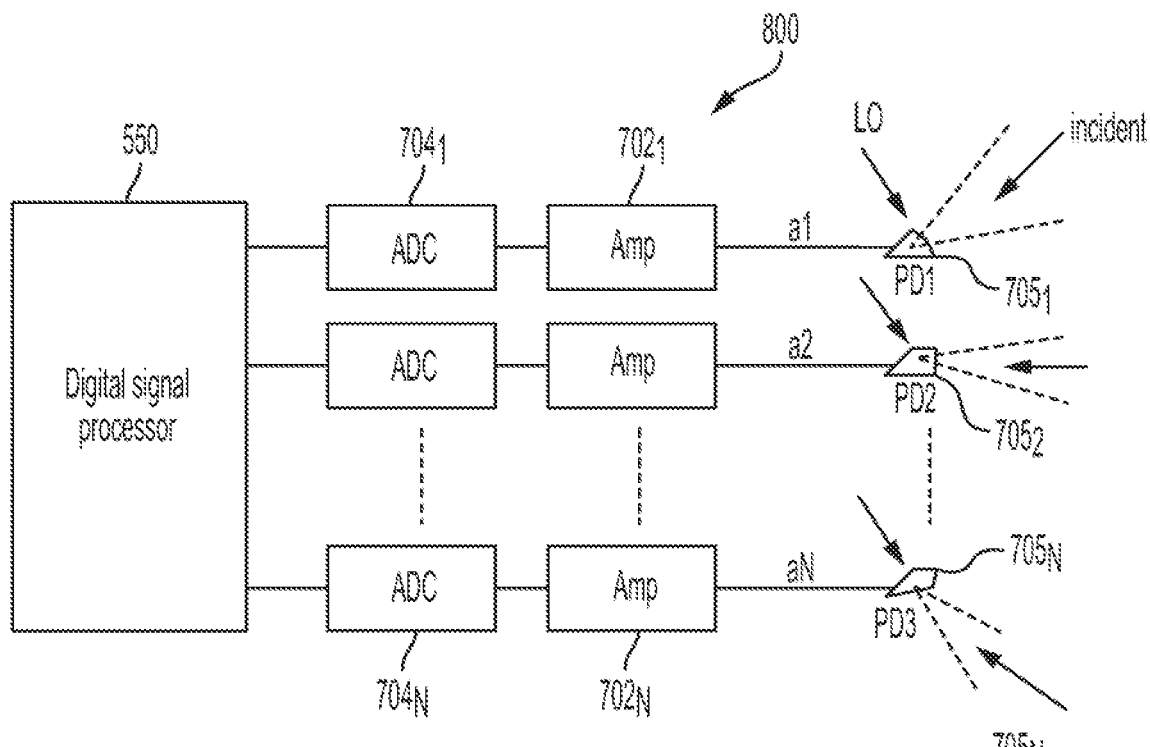
FIG. 19 is a simplified high-level block diagram of a multi-directional receiver, in accordance with one exemplary embodiment of the present invention.

FIG. 19 is a simplified high-level block diagram of a multi-directional receiver 800, in accordance with another exemplary embodiment of the present invention. Multi-directional receiver 800 is similar to multi-directional receiver 700 of FIG. 17 except that in receiver 800, each photo detector $705_1$ in addition to receiving the light incident on the aperture concurrently receives a local oscillating (LO) to generate a mixed signal $a_i$ having a frequency and phase defined by a difference between the frequency and phase of the received light signal and the LO signal, respectively. LO signal can be modulated or continuous wave to achieve the desired electrical mixed component signal.

Figure 20:
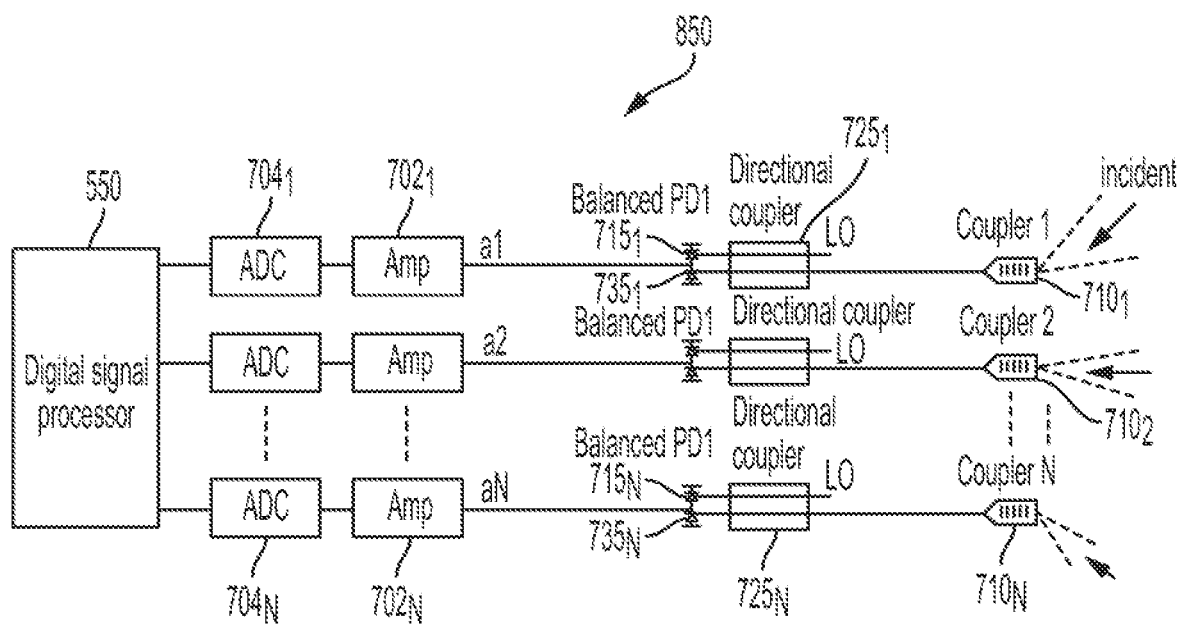
FIG. 20 is a simplified high-level block diagram of a multi-directional receiver, in accordance with one exemplary embodiment of the present invention.

FIG. 20 is a simplified high-level block diagram of a multi-directional receiver 850, in accordance with another exemplary embodiment of the present invention. Multi-directional receiver 850 is similar to multi-directional receiver 750 of FIG. 18 except that in receiver 850, the light received from each grating coupler $710_i$ is mixed with an LO signal through a mixer that includes a directional coupler and a pair of photo-detectors. Photodetectors $715_i$ and $735_i$ form a balanced photo detector, as shown for example, in FIG. 13. Signal $a_i$ generated by photodetectors $715_i$ and $735_i$ has a frequency and phase defined by a difference between the frequency and phase of the received light signal and the LO signal, respectively.

A multibeam phased array transceiver includes a multi-beam transmitter phased array, as described above, that illuminates multiple points of a target object, and a multi-beam phased array receiver or a multi-directional receiver, also as described above, that collect the light reflecting from those points. The combination of, a multibeam transmitter or a set of single beam or multibeam transmitters with a multibeam receiver or a set of single beam or multibeam receivers, as described above, can be used to form a multi-beam transceiver.

In accordance with one embodiment of the present invention, an optical phased array transmitter in which the spacing between its radiating elements (see, e.g., radiating elements $50_i$ of FIG. 1) is larger than $\lambda/2$ ($\lambda$ is the wavelength of light) is used to generate $M_{Tx}$ grating lobes that illuminate multiple points on the object. The receiver then captures the light reflecting from those points and forms an image of the target. In one embodiment, the spacing between the radiating elements of the transmitter may be a multiple of $\lambda/2$.

In one embodiment in which the phased array transmitter has $M_{Tx}$ grating lobes, the spacing between the receiver elements (see, e.g., receiving elements $504_i$ of FIG. 11) may also be selected to be larger than $\lambda/2$ such that the phased array receiver has $M_{Rx}$ reception grating lobes. In one embodiment, the spacing between the transmitter elements and the receiver elements are selected such that only one reception grating lobe coincides with one transmitter grating lobe.

In one embodiment, the spacing between the transmitter elements is selected to be $N_{Tx}\lambda/2$, and the spacing between the receiver element is selected as $N_{Rx}\lambda/2$, where $N_{Tx}$ and $N_{Rx}$ are coprime numbers. Therefore, only one receiver grating lobe coincides with one transmitter grating lobe.

In one embodiment, a receiver as described in accordance with any of the embodiments described herein, is used to capture reflections from multiple illuminated points. The reception beam is then steered to collect data from multiple points. In one embodiment, $M_{Tx}$ receivers are used each looking at one of the illuminated points. Thus, light reflected from all the illuminated points are received concurrently.

In one embodiment, an electronic beam former receiver, as shown, for example in FIGS. 14 and 16, is used with the same aperture of $N_{Rx}\lambda/2$ element spacing. In the electronic domain multibeam via receiver grating lobes are generated for all the steering angles simultaneously to receive the light reflecting from each illuminated point.

In the embodiments in which the radiating aperture of the transmitter includes a one-dimensional array of radiators, steering in one direction (azimuth or elevation) is achieved by phase shifting, and the steering in the other angle is achieved through the frequency sweep.

In the embodiments in which the radiating aperture of the transmitter includes a two-dimensional array of radiators, steering in both directions is achieved through phase shifting. In such embodiments, the spacing between the radiating and receiving elements may be selected so that a multi-beam is generated by having multiple grating lobes in one direction, while a single beam is generated in another direction (azimuth or elevation).

In the embodiments in which the radiating aperture of the transmitter includes a two-dimensional array of radiators, and the receiving aperture of the receiver includes a two-dimensional array of receiving elements, steering in both directions is achieved through phase shifting. In such embodiments, the spacing between the radiating and receiving elements may be selected so that a multi-beam is generated by having multiple grating lobes in both directions.

Embodiments of the present invention are adapted to perform in environments that cause interference and include noise from source such as other LiDAR or optical systems. Several techniques are developed for a Network of optical systems to cooperate in the same environment.

In one embodiment, a dedicated wavelength is used for each system (i.e., transmitter, receiver, or transceiver). Each such system operates having a single optical carrier which is modulated with, for example, a bandwidth of 100 GHz. A phased array transceiver as described above, in accordance with embodiments of the present invention, is capable of 2D beam steering with a single wavelength.

In one example, a range of wavelength is dedicated to each system. In one exemplary embodiment, a range of 100 nm with channel spacing of 150 nm is used for each system. A phased array transceiver as described above, in accordance with embodiments of the present invention, may have a beam steering capability with wavelength sweeping within a given range.

To mitigate interference, an optical filter may be used to block light from other source and wavelengths. In one embodiment, an array waveguide grating is used on chip to differentiate different wavelengths. In one embodiment, a chain of ring resonators is used to differentiate between the wavelengths.

Embodiments of the phased array receiver using a heterodyne detection, such as that shown in FIG. 12 benefit from a strong filtering effect. The limited bandwidth of the photo-detectors filters out any component having a frequency difference with the local (LO) oscillator signal that is more than the detector bandwidth. Therefore, only the incoming signal with frequency content close to the LO signal is downconverted to the electrical domain.

In one embodiment, to distinguish between the transmitted signal and interference, the transmitted signal is modulated using a known code. The code filters our interference from other sources. To ensure others are not using the same code, a wireless link may be used to communicate with other transceiver nodes. Furthermore, in some embodiments, during a given period of time, the transmitter may be placed in a silence mode to detect whether the same code is being used by others. If so detected, the code may be changed on the fly.

In one embodiment, different time slots are assigned to different transmitters/receivers via a network for radiation and reception (detection). Each such transmitter/receiver receives a dedicated time slot from the network and transmits its signal in that time slot. When the communication channel is used by others, the transmitter remains silent to avoid interference.

Figure 21:
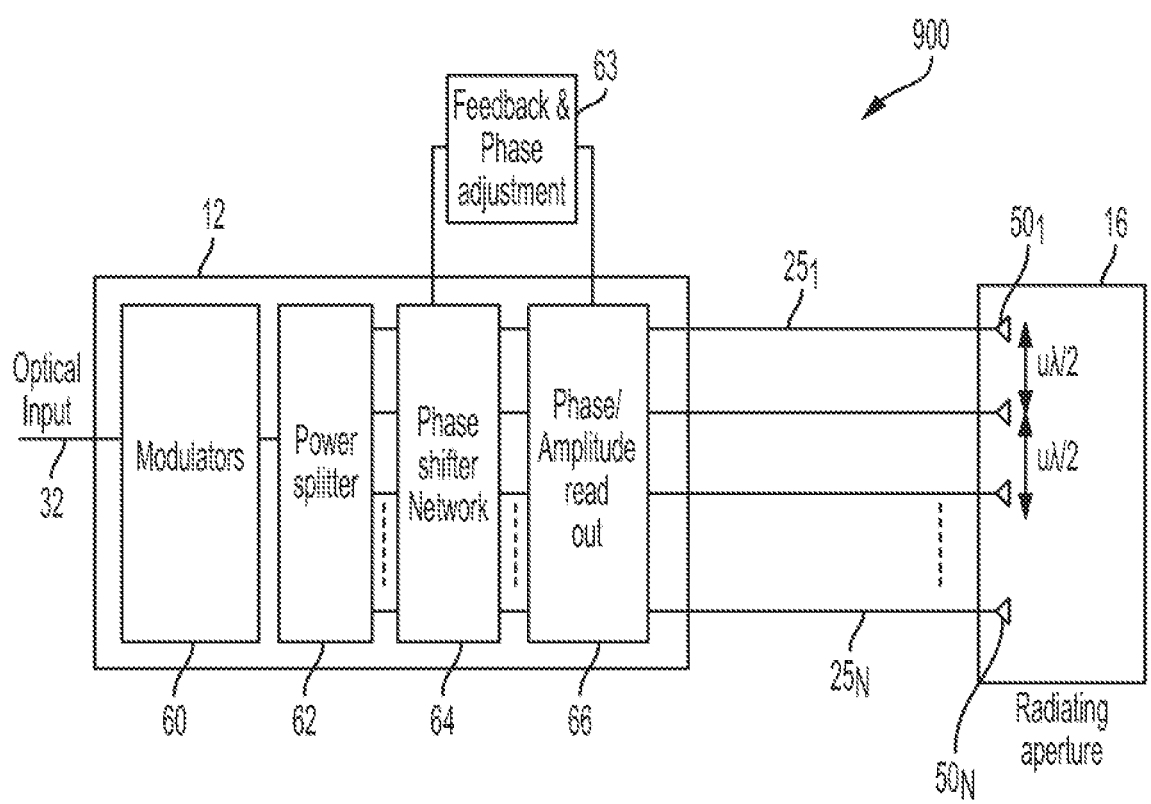
FIG. 21 is a simplified high-level block diagram of an optical transmitter, in accordance with one exemplary embodiment of the present invention.

FIG. 21 is a simplified high-level block diagram of a co-prime optical transmitter 900, in accordance with one embodiment of the present invention. Transmitter 900 is shown, as including in part, a radiating aperture 16 that includes N radiating elements $50_i$ where i is an index ranging from 1 to N, and a beam processor 12. The spacing between adjacent radiating elements $50_i$ and $50_{i+1}$ of the radiating aperture is selected to be $U\lambda/2$ where $\lambda$ is the wavelength of the light being transmitted and U is an integer number. Beam processor 12 is described above in detail above with reference to FIGS. 1 and 2.

Figure 22:
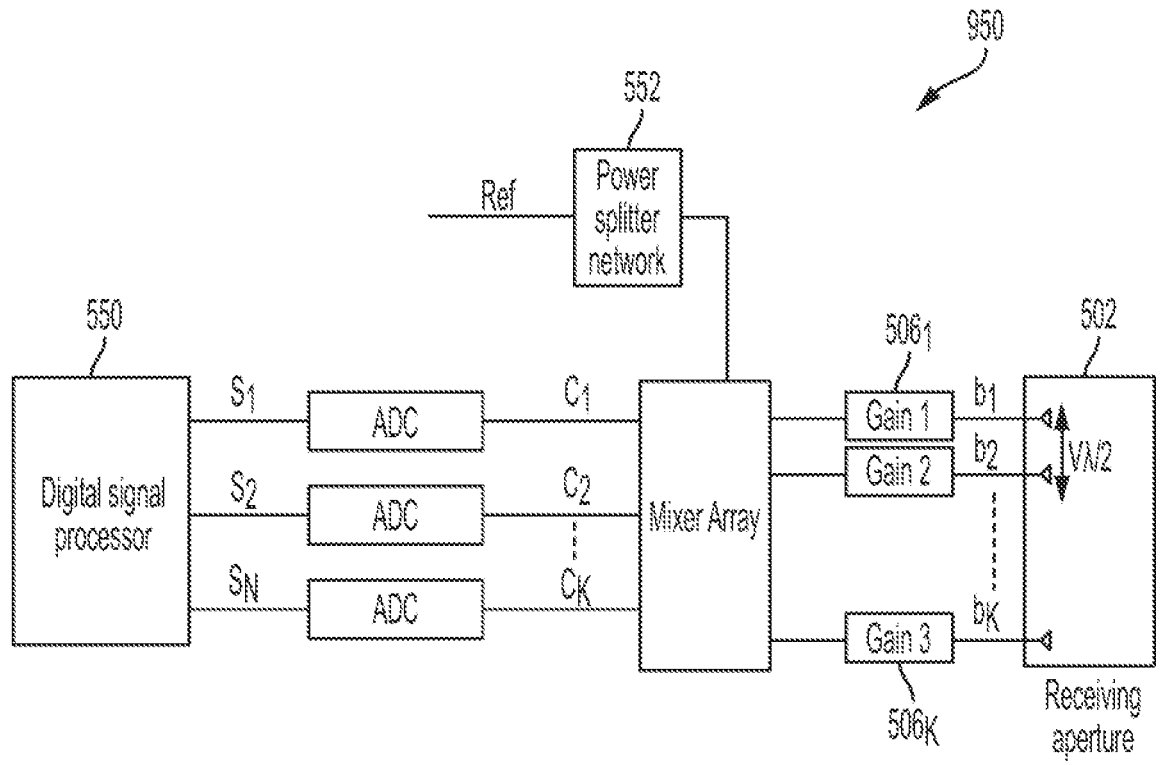
FIG. 22 is a simplified high-level block diagram of an optical receiver, in accordance with one exemplary embodiment of the present invention.

FIG. 22 is a simplified high-level block diagram of a co-prime optical receiver 950, in accordance with one embodiment of the present invention. Optical receiver 950 together with optical transmitter 900 of FIG. 21 form a co-prime optical transceiver. Co-prime optical receiver 950 is similar to the receiver shown in FIG. 16, except that in co-prime optical receiver 950, the spacing between adjacent receiving elements $504_j$ and $504_{(j+1)}$ is selected to be $V\lambda/2$, where V is an integer number forming a co-prime number with U described with reference to FIG. 21.

A co-prime optical receiver, in accordance with another embodiment of the present invention, is similar to the receiver shown in FIG. 14, except that the spacing between adjacent receiving elements $504_j$ and $504_{(j+1)}$ of such a receiver is selected to be $V\lambda/2$.

Referring to FIG. 1, radiating aperture 16 includes an array of radiating elements each radiating the received optical signal into the free space. In one embodiment, a micro-lens is placed on top of each radiating element to modify its pattern and radiation efficiency. In one embodiment, the layer on top of each element is etched thereby to form a lens thereon so as to modify the radiating elements' pattern. In one embodiment, a relatively large lens is place on the whole aperture to modify the general radiation pattern. While such lenses may be used to increase the performance of the aperture, a radiating aperture, in accordance with embodiments of the present invention may operate without such lenses.

Figure 23:
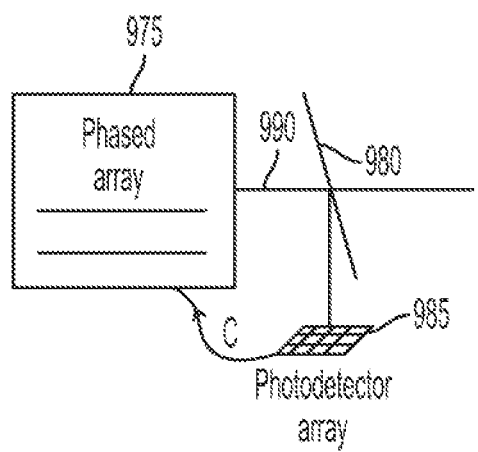
FIG. 23 is a simplified block diagram of a phased array, in accordance with one embodiment of the present invention.

In one embodiment, a beam splitter is positioned in front of the aperture that splits a small portion of the light. The portion so split is subsequently detected by a photodetector array and used to correct the beam. FIG. 23 is a simplified block diagram of a phased array 975. A portion of the beam 990 entering or exiting the phased array 975 is shown as being split by beam splitter 980 and directed toward photodetector array 985. In response, the photodetector array 985 generates a signal C that is used as a feedback signal to adjust the beam 990.

The above embodiments of the present invention are illustrative and not limitative. Other additions, subtractions or modifications are obvious in view of the present disclosure and are intended to fall within the scope of the appended claims.

What is claimed is:

1. An optical phased array transmitter comprising:
   K beam processors, each beam processor adapted to receive a different one of K optical signals and generate N optical signals in response;
   a combiner adapted to:
   receive the N×K optical signals from the K beam processors; and
   combine K optical signals from different ones of the K beam processors to generate N optical signals; and
   N radiating elements each adapted to radiate one of the N optical signals.

2. The optical phased array transmitter of claim 1 wherein a difference between phases of each pair of associated optical signals generated by the same beam processor is a same.

3. The optical phased array transmitter of claim 2 further comprising: a splitter adapted to generate the K optical signals from a received optical signal.

4. The optical phased array transmitter of claim 2 wherein each of the K optical signals has a different wavelength.

5. The optical phased array transmitter of claim 2 wherein each beam processor comprises:
   a modulator adapted to modulate an amplitude and/or phase of the optical signal the beam processor receives.

6. The optical phased array transmitter of claim 5 wherein each beam processor further comprises:
   a plurality of splitters adapted to split the modulated optical into N optical signals.

7. The optical phased array transmitter of claim 6 wherein each beam processor further comprises:
   a plurality of phase shifters each adapted to shift a phase of one of the N optical signals.

8. The optical phased array transmitter of claim 6 wherein each beam processor further comprises:
   a plurality of optical signal measurement units each adapted to receive and convert a portion of one of the N optical signals to an electrical signal.

9. The optical phased array transmitter of claim 8 wherein each optical signal measurement unit comprises a photo-detector adapted to generate an electrical signal in response to a voltage that is turned on and off during different time periods.

10. The optical phased array transmitter of claim 6 wherein each beam processor further comprises:
    a plurality of optical signal measurement units each adapted to receive and combine a portion of a different pair of N optical signals and convert the combined signal to an electrical signal.

11. The optical phased array transmitter of claim 6 wherein each beam processor further comprises a plurality of optical signal measurement units each comprising:
    a first optical signal coupler adapted to receive a portion of a first one of the N optical signals;
    a first splitter adapted to split the portion of the first optical signal into third and fourth optical signals;
    a second optical signal coupler adapted to receive a portion of a second one of the N optical signals;
    a second optical splitter adapted to split the portion of the second optical signal into fifth and sixth optical signals;
    a phase shifter adapted to shift the phase of the fifth optical signal by a first value to generate a seventh optical signal;
    a first optical signal combiner adapted to combine the third and sixth optical signals to generate an eight optical signal;
    a second optical signal combiner adapted to combine the fourth and seventh optical signals to generate a ninth optical signal;
    a first photo-detector adapted to convert the eight optical signal into a first electrical signal; and
    a second photo-detector adapted to convert the ninth optical signal into a second electrical signal.

* * * * *